(12) United States Patent
Tomita et al.

(10) Patent No.: US 8,259,183 B2
(45) Date of Patent: Sep. 4, 2012

(54) SHOOTING LENS HAVING VIBRATION REDUCING FUNCTION AND CAMERA SYSTEM FOR SAME

(75) Inventors: Hiroyuki Tomita, Yokohama (JP); Kazutoshi Usui, Kawasaki (JP); Tsuyoshi Matsumoto, Shinagawa-ku (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/064,323

(22) Filed: Mar. 18, 2011

(65) Prior Publication Data

US 2011/0169973 A1 Jul. 14, 2011

Related U.S. Application Data

(60) Division of application No. 12/588,400, filed on Oct. 14, 2009, now Pat. No. 7,932,926, which is a continuation of application No. 11/037,323, filed on Jan. 19, 2005, now abandoned, which is a continuation-in-part of application No. 10/893,501, filed on Jul. 19, 2004, now abandoned.

(30) Foreign Application Priority Data

Jul. 25, 2003 (JP) ................. 2003-279688
Jul. 25, 2003 (JP) ................. 2003-280097

(51) Int. Cl.
*H04N 5/228* (2006.01)
*G03B 17/00* (2006.01)

(52) U.S. Cl. ............... 348/208.4; 348/208.1; 348/208.2; 396/52

(58) Field of Classification Search ............... 348/208.1, 348/208.2, 208.4, 208.5, 208.7, 208.8, 208.11, 348/208.12, 229.1; 396/52, 55

See application file for complete search history.

(56) References Cited

U.S. PATENT DOCUMENTS

| | | | |
|---|---|---|---|
| 5,666,158 A * | 9/1997 | Sekine et al. | 348/208.99 |
| 5,878,286 A * | 3/1999 | Tomita et al. | 396/53 |
| 6,097,896 A * | 8/2000 | Usui | 396/55 |
| 6,130,709 A | 10/2000 | Sekine et al. | |
| 6,429,895 B1 | 8/2002 | Onuki | |
| 6,573,930 B2 * | 6/2003 | Kyuma et al. | 348/208.5 |
| 6,734,901 B1 * | 5/2004 | Kawahara et al. | 348/208.4 |
| 6,734,902 B1 * | 5/2004 | Kawahara | 348/208.8 |
| 2003/0035053 A1 | 2/2003 | Kyuma et al. | |

FOREIGN PATENT DOCUMENTS

| | | |
|---|---|---|
| JP | A-9-284635 | 10/1997 |
| JP | A-10-145662 | 5/1998 |
| JP | A-10-150595 | 6/1998 |
| JP | A-10-322585 | 12/1998 |

(Continued)

*Primary Examiner* — Nhan T Tran

(74) *Attorney, Agent, or Firm* — Oliff & Berridge, PLC

(57) ABSTRACT

The invention includes a vibration reduction mechanism, a vibration detecting part, a reference signal generating part, a target drive position calculating part, and a driving part. The vibration reduction mechanism reduces a vibration of a subject image. The vibration detecting part outputs a vibration detection signal. The reference signal generating part estimates a reference signal of the vibration detection part. The target drive position calculating part obtains a vibration component from a difference between the vibration detection signal and the estimated reference signal to obtain a target position to which the vibration reduction mechanism is driven. The driving part controls the vibration reduction mechanism to follow the target position. Particularly, the reference signal generating part corrects the reference signal according to a motion signal obtained from a captured image. An accurate reference signal can be obtained by the correction, thereby improving the performance of the vibration reduction.

6 Claims, 17 Drawing Sheets

FOREIGN PATENT DOCUMENTS

| | | |
|---|---|---|
| JP | A-11-164188 | 6/1999 |
| JP | A-11-187305 | 7/1999 |
| JP | A-11-187308 | 7/1999 |
| JP | A-2001-54005 | 2/2001 |

* cited by examiner

Fig. 5
SIMULATION RESULT OF PRESENT EMBODIMENT
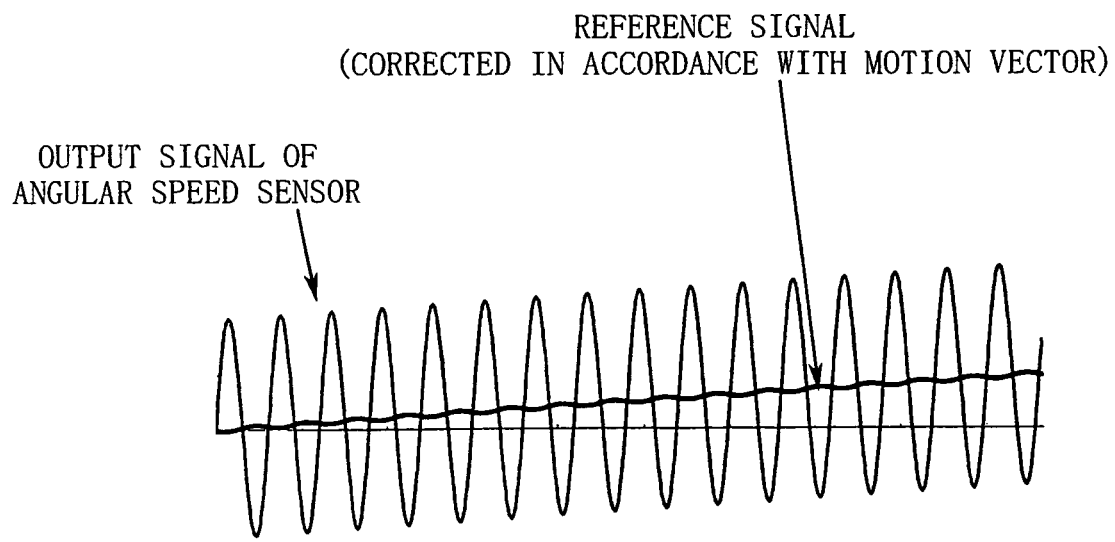
FIG. 5A
FIG. 5B
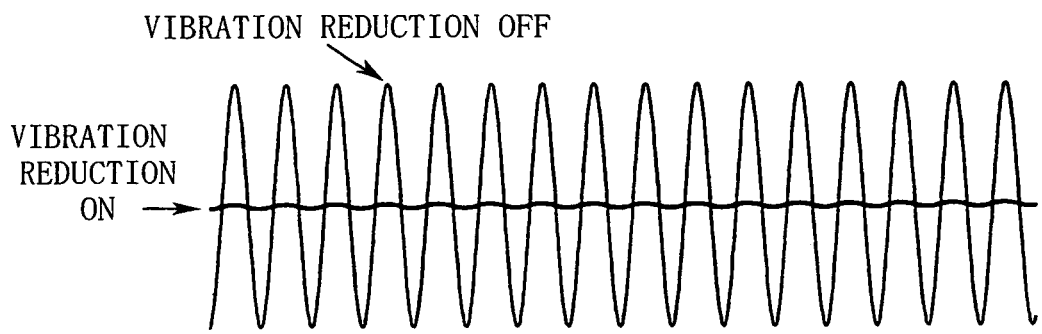
FIG. 5C

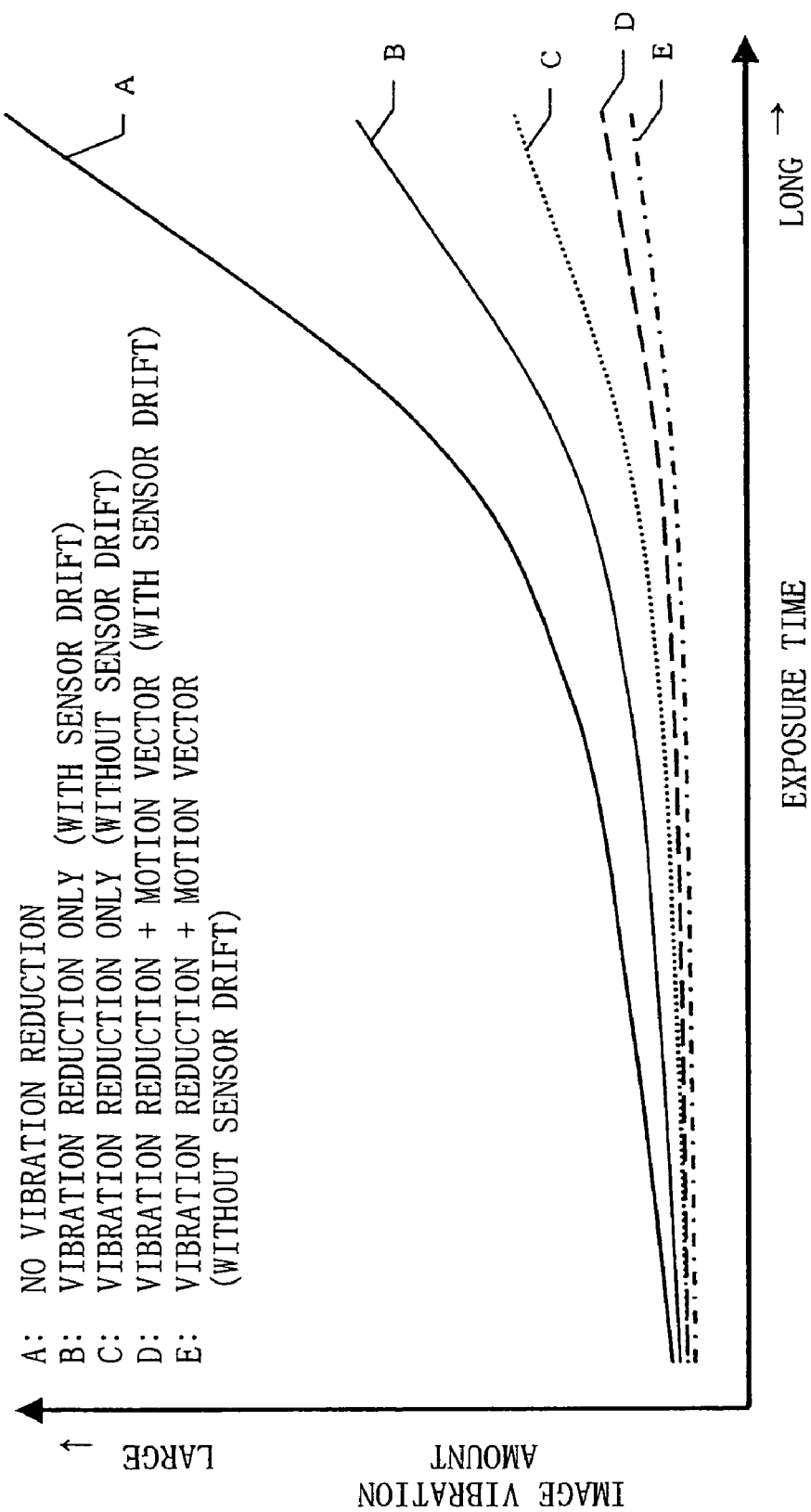

SIMULATION RESULT OF
ESTIMATED REFERENCE SIGNAL BY MOVING AVERAGE

PRIOR ART

SHOOTING LENS HAVING VIBRATION REDUCING FUNCTION AND CAMERA SYSTEM FOR SAME

CROSS REFERENCE TO RELATED APPLICATION

This application is a Division of U.S. patent application Ser. No. 12/588,400, filed on Oct. 14, 2009, which is a Continuation of U.S. patent application Ser. No. 11/037,323, filed on Jan. 19, 2005, which is a Continuation-in-Part of U.S. patent application Ser. No. 10/893,501, filed on Jul. 19, 2004, and claims the benefit of priority from Japanese Application Nos. 2003-279688 and 2003-280097, both filed Jul. 25, 2003. The disclosure of the prior application is hereby incorporated by reference herein in its entirety.

BACKGROUND OF THE INVENTION

1. Field of the Invention

The present invention relates to a shooting lens for reducing a vibration of an image of a subject and a camera system therefor.

2. Description of the Related Art

There has been a known technique for driving a vibration reduction mechanism to reduce a vibration of an image of a subject due to a hand vibration or the like. Such a known technique includes a vibration reduction mechanism (such as an optical vibration reduction system or the like) and an angular speed sensor. The angular speed sensor detects vibration of a shooting lens and of a camera. The shooting lens decides, from the angular speed, the position of the vibration reduction mechanism to eliminate the vibration of the image (hereinafter referred to as target drive position), and moves the vibration reduction mechanism to the target drive position.

In addition, the shooting lens executes a positional control over the vibration reduction mechanism, moving it back to the center position (hereinafter referred to as center bias control), by feeding back the displacement thereof to the control over the vibration reduction mechanism. The center bias control allows the vibration reduction mechanism to be moved back to the vicinity of the center position thereof. As a result, it is possible to substantially expand the moving range of the vibration reduction mechanism.

Japanese Unexamined Patent Application Publication No. Hei 10-322585 (FIG. 1) (Reference 1) and 10-145662 (FIG. 1 and FIG. 3) (Reference 2) have disclosed an image vibration reduction technique for a video camera. The video camera detects a motion signal from a captured image. Then, the video camera interpolates the motion signal to raise the sampling grade thereof. The video camera improves the vibration reduction performance by feeding back the interpolated motion signal to a target drive position that is updated at high speed.

[Problems of Known Technique]

In the known vibration reduction control technique, a DC offset and a drift contained in an output of an angular speed sensor cause problems, because odd components such as these DC offset and drift have to be removed in order to accurately detect the vibration of a subject image. However, these odd components vary depending on the temperature and use conditions of the angular speed sensor. Thus, the values of the DC offset and drift measured for shipment are not usable for actual shooting. Conventionally, they are separated and extracted from an output of the angular speed sensor when a subject is actually shot.

A vibration of a user's hand has frequency components whose dominant frequencies are in the range from 2 to 7 Hz. On the other hand, the angular speed sensor in a stationary state outputs frequency components whose dominant frequencies are less than 1 Hz. Thus, by the use of the moving average or a low-pass filter, low frequency components are extracted from an output signal of the angular speed sensor, thereby estimating the DC offset and drift in real time.

However, by this known technique, a reference signal has various errors. FIG. 12A, FIG. 12B, and FIG. 12C show a simulation result of a conventional reference signal estimation. In FIG. 12A, the moving average of the angular speed sensor is calculated in accordance with an output signal thereof to obtain a reference signal. The moving average causes a delay in the phase of the drift of the reference signal. In addition, the reference signal contains a vibration component that is not completely smoothened by the moving average. When a reference signal containing an error is removed from the output signal of the angular speed sensor, the angular speed will has an error shown in FIG. 12B.

In FIG. 12C, a thick line represents a result of a variation reduction operation for an angular speed including an error. Although a high frequency component of a hand vibration decreases, the vibration reduction mechanism gradually drifts over time.

As described above, the vibration reduction performance depends on how accurate reference signal of the angular speed sensor can be obtained.

[Problems of References 1 and 2]

In the techniques disclosed in the References 1 and 2, a motion signal is used to reduce a vibration of an image. However, the controlling systems therein are for shooting movies. If these techniques are applied to electronic still cameras, the following problems [1] and [2] will arise.

[1] An electronic still camera acquires a motion signal from an image for monitor display before a shutter release. In this case, the shooting interval of the electronic still camera (for example, 30 frames/second) is several times longer than the shooting interval of a common video camera (for example, 60 fields/second in the NTSC system). In other words, the electronic still camera has a longer sampling interval of a motion signal. Feeding back the motion signal with a long interval to the target drive position cannot achieve sufficient vibration reduction effect.

[2] Moreover, in the technique disclosed in References 1 and 2, the motion signal is extrapolated so that the interval of the motion signal matches with the update interval of the target drive position. On the other hand, the electronic still camera uses a motion signal with a long sampling interval. Thus, it is difficult to estimate accurate extrapolation so that discontinuous errors may occur in the extrapolation. The errors in the extrapolation results in errors in the control of the target drive position. As a result, the vibration reduction effect may conspicuously deteriorate.

In the technique disclosed in the References 1 and 2, the motion signal is fed back to the target drive position. On this point, the technique is clearly different from an invention by which the reference signal is corrected with the motion signal. Moreover, in the References 1 and 2, a high-pass filter is disposed in a feedback path for the motion signal. The high-pass filter does not allow low frequency components corresponding to the drift and offset to pass therethrough. Consequently, the technique disclosed in the References 1 and 2 is not able to properly correct the drift and offset of low frequency range.

Moreover, for the electronic still camera, unlike a video camera, photographing with a long exposure (an exposure of 1/15 seconds or longer) needs to be considered. At shooting with a long exposure, the image vibration will arise from a low speed drifting movement. However, in the video camera the low speed drifting movement does not cause the image vibration due to its slow shutter speed.

A very low frequency component of a drift causing the image vibration does not pass through the foregoing high-pass filter. Because of this, the technique disclosed in the References 1 and 2 cannot prevent the image vibration caused by a long-exposure shooting.

[Problem Caused by Synergy Between Motion Signal and Center Bias]

To keep the vibration reduction mechanism at its center position, it may need to increase the feedback gain of the center bias. In this case, strong force returning the vibration reduction mechanism to the center position will occur (hereinafter, this force is referred to as bias power). A strong bias power causes deterioration in the stability of the vibration reduction control; accordingly, it may cause the vibration reduction mechanism to oscillate at worst.

In addition, the inventors of the present invention have found that the feedback of the motion signal to the vibration reduction mechanism causes a problem that the vibration reduction mechanism is likely to oscillate because the stability of the vibration reduction control remarkably deteriorates by a synergistic effect of the feedback of the motion signal and the center bias. The inventors have also found that the feedback of the motion signal to the vibration reduction control causes another problem that the vibration reduction mechanism moves unnecessarily when it stops.

[Problems in Intentional Movement of Camera]

Normally, before shooting a subject, the user needs to change the orientation of the camera to decide a composition of an image to be shot. In addition, the user may need to vibrate the camera to pan a moving subject as it moves.

When the camera is intentionally moved (hereinafter generally referred to as "panning"), since the angle of vibration is larger than the vibration of hand, the output of the angular speed sensor largely varies. When the output varies, it becomes difficult and inaccurate to estimate the reference signal of the angular speed sensor. As a result, the reference signal contains a large error. Accordingly, the vibration reduction would become inaccurate.

In addition, the panning causes the shot image on the camera side to move. As with a residual vibration of a drift output of the angular speed sensor, the motion of the image is detected as a motion signal. When the motion signal is directly fed back to the vibration reduction system, the motion of the panned image would momentarily delay. Alternatively, the motion of the panned image would stop. When the panning is preformed for a long time, the vibration reduction system would exceed its drive limit.

SUMMARY OF THE INVENTION

In view of solving the forgoing problems, an object of the present invention is to obtain an accurate reference signal for vibration reduction.

Another object of the present invention is to enhance the effects of vibration reduction by selecting a portion to which a motion signal is fed back.

Another object of the present invention is to provide a vibration reduction control system suitable for an electronic still camera.

Another object of the present invention is to properly monitor a change in a vibration reduction control and properly change a feedback of a motion signal according to the change in the vibration reduction control.

Another object of the present invention is to prevent the stability of a vibration reduction control from deteriorating when the power of a center bias increases.

Another object of the present invention is to suppress unnecessary movement of a vibration reduction mechanism upon stopping a vibration reduction control.

Next, the present invention will be described in detail.

[1] According to an aspect of the present invention, a shooting lens forms an image of a subject on an imaging plane of a camera. The shooting lens includes a vibration reduction mechanism, a vibration detecting part, a reference signal generating part, a target drive position calculating part, and a driving part.

The vibration reduction mechanism reduces a vibration of the image of the subject. The vibration detecting part detects the vibration of the camera and outputs a vibration detection signal. The reference signal generating part estimates a reference signal of the vibration detection signal (an output of the vibration detecting part while the camera is in a stationary state and free of a vibration) in accordance with the vibration detection signal. The target drive position calculating part obtains a vibration component as a cause of the image vibration from a difference between the vibration detection signal and the estimated reference signal to obtain a target position to which the vibration reduction mechanism is driven according to the vibration component. The driving part controls the vibration reduction mechanism to follow the target position.

In particular, the reference signal generating part acquires information on a motion signal obtained by analyzing a captured image with the camera and corrects the reference signal according to the motion signal.

Next, the operation and effect of the shooting lens will be described.

Generally, an error in the reference signal leads to an error in the detection of a vibration component, causing a residual vibration of a captured image. Thus, with the shooting lens of this invention the residual vibration of the captured image is detected as a motion signal to correct the reference signal using this motion signal. The feedback of the motion signal makes it possible to surely decrease the error in the reference signal. This consequently decreases the error in the detection of the vibration component with sureness, and further improves the vibration reduction accuracy.

In particular, the reference signal given a feedback has dominant frequencies of much lower range than those at the target drive position that is updated with a shorter interval. Because of that, it is not likely that feeding back thereto the motion signal with a long sampling interval causes the overrunning of the control system so that, stable and appropriate control can be made. In other words, the reference signal of low dominant frequencies is suitable to be given the motion signal with a long sampling interval.

Even if the reference signal varies due to an external disturbance, the motion vector feedback can restore the varying reference signal to a normal value. As a result, a vibration reduction with very high robustness of a reference signal against an external disturbance can be accomplished.

[2] It is preferred that the reference signal generating part should feed back the motion signal to the reference signal and correct the reference signal to contain a drift output of the vibration detecting part. It is also preferred that the motion signal feedback should be done without removing a low frequency component of the motion signal so that a drift output of the low frequency range can be accurately contained in the reference signal. Moreover, It is preferred that the component of an image of a low motion speed due to a drift output is to be detected selectively as the motion signal.

[3] It is preferred that the reference signal generating part should convert a scale of the motion signal into that of the reference signal according to a focal distance and a magnification of the shooting lens and correct the reference signal according to the motion signal of the converted scale.

[4] It is preferred that the reference signal generating part should update the reference signal as a corrected reference signal, the target drive position calculating part should update the target position, and a cycle in which the reference signal generating part updates the reference signal is longer than a cycle in which the target drive position calculating part updates the target position.

[5] It is preferred that the shooting lens should further include a phase compensating part which performs lead compensation for the phase of the motion signal. The reference signal generating part corrects the reference signal in accordance with the phase-compensated motion signal. In addition, it is preferred that the lead compensation is to compensate a delay in the calculation of the motion signal.

[6] Preferably, the reference signal generating part includes a feedback path and a gain changing part. The feedback path acquires information on the motion signal obtained by analyzing the image shot with the camera and feeds back the motion signal to the reference signal, to correct the reference signal. The gain changing part obtains from the camera information on a timing when the camera is to start a shooting preparation for a still image. The gain changing part starts the feedback of the feedback path after a start of the shooting preparation. Alternatively, the gain changing part increases the feedback after the start of the shooting preparation.

Next, the operation and effect of this structure will be described.

Before a start of the shooting preparation, the user generally pans the camera, composing an image to be shot. After the start of the shooting preparation, on the other hand, the user often waits for a good timing to shoot (for example, timing to fully press the release button of the camera), keeping the composition of the image.

Thus, it is highly likely that the panning to decide the composition of the image is completed before a start of the shooting preparation. It is very unlikely that the panning is performed after the start of the shooting preparation. Thus, starting or increasing the feedback of the motion signal to the reference signal after the start of the shooting preparation makes it possible to surely prevent the reference signal from being erroneously corrected, which occurs due to the panning to decide the composition of the image.

Consequently, it is possible to obtain more accurate reference signals and vibration components as the difference between the vibration detection signal and the reference signal. Accordingly, it is possible to improve the vibration reduction performance with reliability.

[7] Preferably, the reference signal generating part includes a feedback path and a gain changing part. The feedback path acquires information on the motion signal obtained by analyzing the image shot with the camera and feeds back the motion signal to the reference signal, to correct the reference signal. The gain changing part obtains from the camera information on a timing when the camera is to focus the image of the subject. The gain changing part starts the feedback of the feedback path after the camera has focused image of the subject. Alternatively, the gain changing part increases the feedback after the camera has focused the image of the subject.

Next, the operation and effect of this structure will be described.

Generally, the user pans the camera to decide the composition of an image before shooting. However, if the user adjusts the composition to some extent immediately after focusing a target subject, he or she often waits for a good timing to shoot (for example, a timing to fully press the release button), trying not to change the decided composition.

Thus, it is highly likely that the panning to decide the composition of the image is made until or immediately after the subject is into focus. It is very unlikely that the panning is made some time after the subject is into focus. Consequently, after the subject is into focus (preferably an estimated time for adjusting the composition of the image has elapsed immediately after the focusing), the feedback of the motion signal to the reference signal is started or increased. This can accordingly prevent the reference signal from being erroneously corrected due to the panning for deciding the composition of the image to be shot.

In addition, an image that is shot in a non-focused state has blur in its edges. Therefore, accurate motion signals cannot be obtained while the subject is not into focus, so that it is likely that the reference signal is erroneously corrected. With this structure, however, starting correcting the reference signal after the subject is focused can prevent troubles from occurring such as erroneous correction of the reference signal.

Because of this, it is possible to obtain accurate reference signals and vibration components as the difference between the vibration detection signal and the reference signal. This results in improving the vibration reduction performance with reliability.

[8] Preferably, the reference signal generating part includes a feedback path and a gain changing part. The feedback path acquires information on the motion signal obtained by analyzing the image shot with the camera and feeds back the motion signal to the reference signal, to correct the reference signal. The gain changing part detects panning of the camera according to the vibration detection signal and/or the motion signal. The gain changing part starts the feedback of the feedback path after the panning has been completed. Alternatively, the gain changing part increases the feedback after the panning has been completed.

Next, the operation and effect of this structure will be described.

Before shooting a subject, the user pans the camera, composing an image to be shot. However, after deciding the composition, the user often waits for a good timing to shoot (for example, timing to fully press the release button), trying not to move the camera. When the user intentionally pans the camera, the camera will be moved continuously in a certain direction. The movements by the user's intentional panning are obviously different from hand vibrations, which are random vibrations. Consequently, the intentional panning movement can be distinguished from the hand vibration by detecting the characteristics of the panning from the vibration detection signal and/or the motion signal.

Thus, after detection of a completion of the panning, the feedback of the motion signal to the reference signal is started or increased. As a result, it is possible to surely reduce such troubles that the reference signal is erroneously corrected due to the panning for deciding the composition of the image. Accordingly, it is possible to obtain accurate reference signals and vibration components as the difference between the vibration detection signal and the reference signal. This results in improving the vibration reduction performance with reliability.

[9] More preferably, the reference signal generating part includes a feedback path and a gain changing part. The feedback path acquires information on the motion signal obtained by analyzing the image shot with the camera and feeds back the motion signal to the reference signal, to correct the reference signal. The gain changing part obtains from the camera information on a timing when it is to start a shooting preparation for a still picture. In addition, the gain changing part detects panning of the camera from the vibration detection signal and/or the motion signal. When detecting the panning after the start of a shooting preparation, the gain changing part stops the feedback of the feedback path, or alternatively decreases the feedback.

Next, the operation and effect of this structure will be described.

After the camera starts the shooting preparation (for example, the release button is half pressed), the user does not move the camera unless some situation comes up and forces him/her to do so. If panning is detected after the start of the shooting preparation, the camera may be under a special situation such that the user is panning the camera to shoot a moving subject or that the user is waiting for a proper release timing, moving the camera following the moving subject while half-pressing the release button.

Thus, in such situations, stopping (or temporarily stopping) or decreasing the feedback of the motion signal to the reference signal can surely reduce the possibility that the reference signal is erroneously corrected by the panning. As a result, it is possible to obtain more accurate reference signals and vibration components as the difference between the vibration detection signal and the reference signal. This results in surely improving the vibration reduction performance.

[10] According to another aspect of the present invention, a shooting lens forms an image of a subject on an imaging plane of a camera and includes a vibration reduction mechanism, a vibration detecting part, an information obtaining part, a controlling part, and a center bias part. The vibration reduction mechanism reduces a vibration of the image of the subject. The vibration detecting part detects the vibration of the camera and outputs a vibration detection signal. The information obtaining part analyzes an image shot with the camera and acquires information on the motion signal. The controlling part controls the vibration reduction mechanism to perform a feedforward operation using the vibration detection signal and to perform a feedback operation using the motion signal, thereby reducing the vibration of the image. The center bias part biases the vibration reduction mechanism to a center position by feeding back displacement of the vibration reduction mechanism from the center position to the control over the vibration reduction mechanism. In particular, the controlling part decreases a feedback gain of the motion signal as a feedback gain of the center bias part increases, and in contrast it increases the feedback gain of the motion signal as the feedback gain of the center bias part decreases. Note that the configuration described in [10] is essential to maintain a stable control upon the feedback of the motion signal; therefore, it will be described in detail in the following.

Generally, the power biasing the vibration reduction mechanism to the center position increases as the feedback gain of the center bias part increases. The biasing power deteriorates the performance of the vibration reduction mechanism and increases the motion speed of a captured image. As a result, the value of the motion signal is increased. The center bias and the feedback amount of the motion signal synergistically increase, which deteriorates the stability of the vibration reduction control. This causes some problems such as the overrun of the vibration reduction mechanism, large vibration, and oscillation thereof.

In view of solving the problems, the shooting lens according to [10] is configured that the feedback grain of the motion signal decreases as the feedback gain of the center bias part increases. Such a feedback balancing operation can prevent an excessive increase of the feedback amount, thereby enhancing the stability of the vibration reduction. Accordingly, it is able to properly prevent the vibration reduction mechanism from overshooting, vibrating, and oscillating at worst.

The motion signal is a signal from which a residual vibration of an image has been detected. Thus, the decrease in the feedback gain of the motion signal means deterioration in the suppression of the residual vibration in the vibration reduction control. However, it also means that returning the vibration reduction mechanism to its center position (or holding at the center position) is given a higher priority than the suppression of the residual vibration. Thus, the decrease in the feedback gain of the motion signal does not cause much trouble, and does increase the stability of the vibration reduction control; therefore, it can be said that its advantage overcomes its disadvantage.

Moreover, in the shooting lens according to [10], the feedback gain of the motion signal increases as the feedback gain of the center bias part decreases. Such a feedback balancing operation makes it possible to improve the suppression of a residual vibration of an image without deteriorating the stability of the control.

[11] It is preferred that the shooting lens should further include a sensor. The sensor senses (includes obtaining information from the camera) information on at least one of states of the camera which are a state that the camera is fixed by a tripod and a state that the vibration reduction mechanism has moved to its limit. The center bias part increases the feedback gain of the center bias part in accordance with the sensed information. On the other hand, the controlling part decreases the feedback gain of the motion signal in accordance with the sensed information.

[12] According to another aspect of the present invention, a shooting lens forms an image of a subject on an imaging plane of a camera, and includes a vibration reduction mechanism, a vibration detecting part, an information obtaining part, and a controlling part. The vibration reduction mechanism reduces a vibration of the image of the subject. The vibration detecting part detects the vibration of the camera and outputs a vibration detection signal. The information obtaining part analyzes an image captured with the camera and acquires information on the motion signal. The controlling part controls the vibration reduction mechanism to perform a feedforward operation using the vibration detection signal, and to perform a feedback operation using the motion signal, thereby reducing the vibration of the image. In particular, for stopping the vibration reduction operation of the vibration reduction mechanism, the controlling part instructs the vibration reduction mechanism to stop feeding back the motion signal before stopping the feedforward operation.

The configuration in [12] is essential to prevent unnecessary movement of the vibration reduction mechanism when feeding back the motion signal to the vibration reduction control, and will be described in detail in the following.

In the shooting lens according to [12], for stop the vibration reduction operation, the vibration reduction mechanism stops the feedforward operation prior to the feedback operation. This can prevent the continuance of the feedback of the motion signal and unnecessary movement of the vibration reduction mechanism.

[13] It is preferred that the shooting lens should further include a sensor. The sensor senses information on at least one of states of the camera that are a state that the camera is fixed by a tripod and a state that the camera is panning, and a state that the vibration reduction mechanism has moved to its limit. The controlling part stops the feedback of the motion signal according to the sensed information and then stops the feedforward control.

[14] It is preferred that the controlling part includes a reference signal estimating part, a reference signal correcting part, a target drive position calculating part, and a driving part. The reference signal estimating part estimates a reference signal of the vibration detection signal (an output of the vibration detecting part while the camera is in a stationary state and free of a vibration) in accordance with the vibration detection signal. The reference signal correcting part corrects the reference signal by feeding back the motion signal to the reference signal estimated by the reference signal estimating part. The target drive position calculating part obtains a vibration component as a cause of the vibration of the image from a difference between the vibration detection signal and the corrected reference signal to obtain a target position to which the vibration reduction mechanism is driven, according to the vibration component, thereby reducing the vibration of the image. The target position refers to a position at which the vibration reduction mechanism can reduce the image vibration. The driving part controls the vibration reduction mechanism to follow the target position.

[15] The camera system of the present invention includes a shooting lens, an imaging part, and a motion detecting part. The shooting lens is one as set forth in any one of [1] to [11]. The imaging part captures the image of the subject formed on the imaging plane by the shooting lens. The motion detecting part obtains an image captured with the imaging part, detects variation in the captured image with time, and outputs motion of the subject image on the imaging plane as a motion signal. In addition, it is preferred that the shooting lens and the imaging part should be detachably structured to exchange information on the motion signal and so forth therebetween.

As described above, the present invention enables more practical feedback of the motion signal to the vibration reduction. As a result, it is possible to further enhance the vibration reduction technique.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 5A, FIG. 5B, and FIG. 5C are schematic diagrams showing a simulation result of a vibration reduction control according to a first embodiment of the present invention;

FIG. 6 is a graph describing a criterion of a vibration reduction performance according to the first embodiment;

DESCRIPTION OF THE PREFERRED EMBODIMENTS

Next, with reference to the accompanying drawings, embodiments of the present invention will be described in detail.

First Embodiment

Description of Structure of First Embodiment

Figure 1:
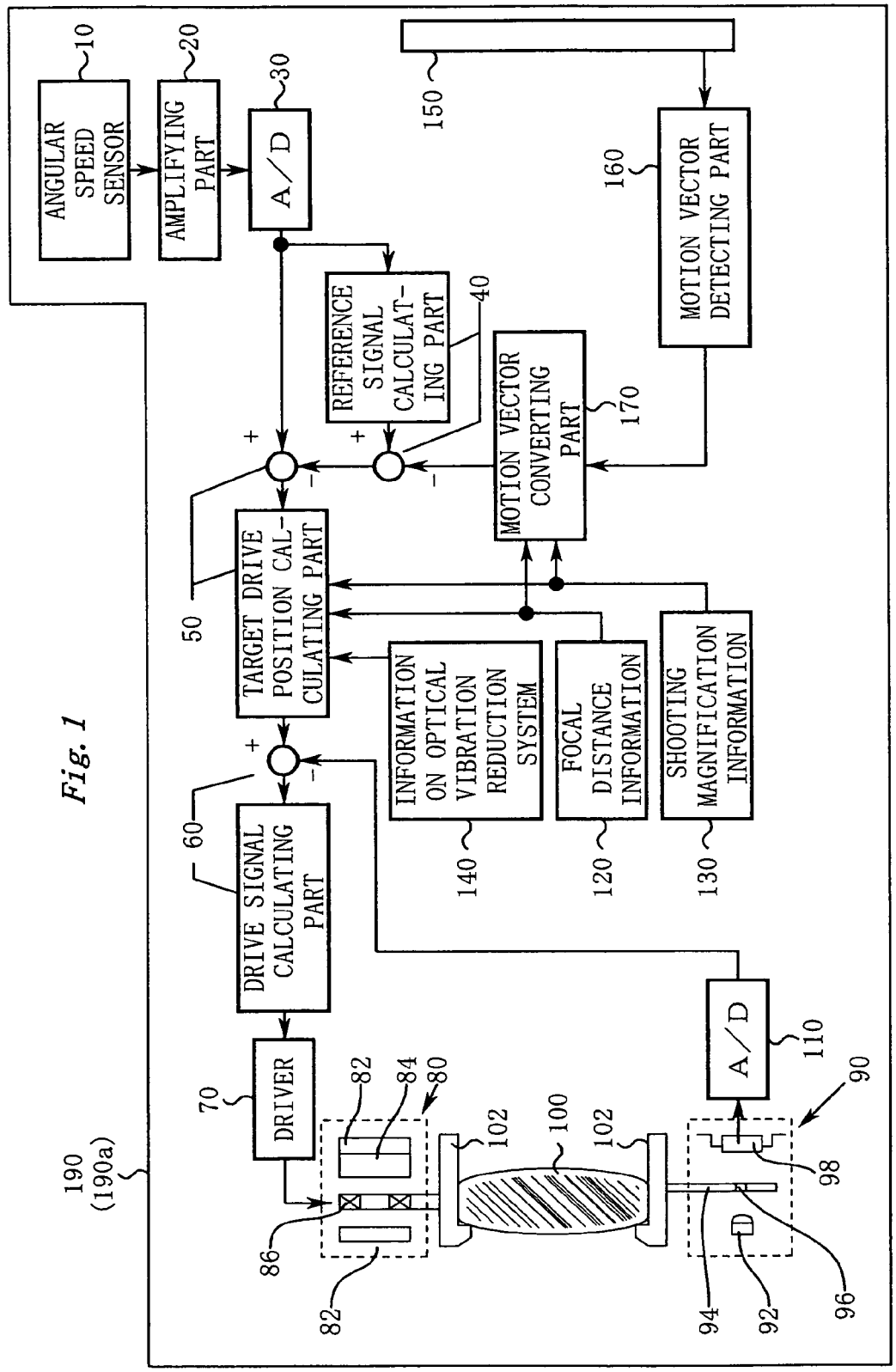
FIG. 1 is a schematic diagram showing a camera system 190 having a vibration reduction mechanism (including a shooting lens 190a)

FIG. 1 shows a schematic block diagram of a camera system 190 (including a shooting lens 190a) according to the first embodiment of the present invention. In reality, the camera system 190 reduces a vibration of an image in two axis directions, horizontal and vertical directions. However, for simplicity, in FIG. 1, a vibration reduction mechanism for one axis is shown.

Next, the structure of each part shown in FIG. 1 will be described.

An angular speed sensor 10 detects a vibration of the camera system 190 as an angular speed using Coriolis force. An amplifying part 20 amplifies an output of the angular speed sensor 10. In addition, a low-pass filter may be disposed to reduce a high frequency noise in the sensor output. An A/D converting part 30 converts an output of the amplifying part 20 into digital angular speed data.

A reference signal calculating part 40 extracts a low frequency component from the angular speed data that is output from the A/D converting part 30 so as to estimate a reference signal of the angular speed (angular speed data in a stationary state and free of a vibration). The reference signal calculating part 40 corrects the reference signal using feedback of a motion vector that will be described later.

A target drive position calculating part 50 subtracts the reference signal from the angular speed data so as to obtain an actual angular speed as a cause of a vibration of an image. The target drive position calculating part 50 integrates the actual angular speed so as to obtain an angle from the optical axis of the shooting lens 190a. The target drive position calculating part 50 decides a target drive position in accordance with the angle from the optical axis. The target drive position is a position in which an optical vibration reduction system 100 can cancel the displacement of an image of a subject at the angle from the optical axis.

The target drive position calculating part 50 decides the target drive position in accordance with focal distance information 120, shooting magnification information 130, and optical information 140 on the optical vibration reduction system 100. The focal distance information 120 is frequently obtained from an output of an encoder of a zoom ring of the shooting lens 190*a* and so forth. The shooting magnification information 130 is frequently obtained in accordance with a position of the shooting lens 190*a* and from an AF driving mechanism. The optical information 140 on the optical vibration reduction system 100 refers to a vibration reduction coefficient (vibration reduction coefficient=image moving amount against lens moving amount/lens moving amount). The optical information 140 is pre-stored in the shooting lens 190*a*.

In addition, the shooting lens 190*a* has a positional sensor 90. The positional sensor 90 senses the position of the optical vibration reduction system 100. The positional sensor 90 has an infrared ray LED 92, a position sensitive detector (PSD) 98, and a slit plate 94. Light emitted from the infrared ray LED 92 passes through a slit hole 96 of the slit plate 94 disposed in a lens barrel 102 of the optical vibration reduction system 100. As a result, a small beam is obtained. The small beam reaches the PSD 98. The PSD 98 outputs a signal that represents the received position of the small beam. The output signal is converted into a digital signal through an A/D converting part 110, thereby obtaining positional data on the optical vibration reduction system 100.

A drive signal calculating part 60 obtains a deviation between the positional data and the target drive position and calculates a drive signal corresponding to the deviation. For example, the drive signal is calculated by PID control algorithm in which a proportional term, an integration term, and a differentiation term are added at predetermined ratios.

A driver 70 supplies a drive current to a driving mechanism 80 according to the obtained drive signal (digital signal).

The driving mechanism 80 is composed of a yoke 82, a magnet 84, and a coil 86. The coil 86 is secured to the lens barrel 102 of the optical vibration reduction system 100. The coil 86 is disposed in a magnetic circuit formed by the yoke 82 and the magnet 84. When a drive current of the driver 70 is supplied to the coil 86, the optical vibration reduction system 100 can be moved in the direction perpendicular to the optical axis.

The optical vibration reduction system 100 is a part of an optical imaging system of the shooting lens 190*a*. Moving the optical vibration reduction system 100 to the target drive position and shifting the focal position of the image of the subject makes it possible to optically reduce the vibration of the image of the subject against an imaging plane.

An image sensor 150 captures an image of a subject that is formed on the imaging plane. A captured image is displayed on a monitor screen (not shown). The captured image is also output to a motion vector detecting part 160.

The motion vector detecting part 160 detects the motion of the captured image over time so as to detect a motion vector containing a residual vibration. A motion vector converting part 170 converts a scale of the motion vector into a scale of a reference signal in accordance with the focal distance information 120 and the shooting magnification information 130. The converted motion vector is used to correct the reference signal by the reference signal calculating part 40.

Relation Between the Claims and the First Embodiment

Next, the relation between the terminology used in claims and the terminology used in the first embodiment will be described. It should be noted that the relation represents only an example, but does not limit the present invention.

A shooting lens as set forth in claims corresponds to the shooting lens 190*a*.

A vibration reduction mechanism as set forth in claims corresponds to the optical vibration reduction system 100.

A vibration detecting part as set forth in claims corresponds to the angular speed sensor 10.

A reference signal generating part as set forth in claims corresponds to the reference signal calculating part 40 and the motion vector converting part 170.

A target drive position calculating part as set forth in claims corresponds to the target drive position calculating part 50.

A driving part as set forth in claims corresponds to the drive signal calculating part 60, the driver 70, the driving mechanism 80, and the positional sensor 90.

A camera system as set forth in claims corresponds to the camera system 190.

A motion signal as set forth in claims corresponds to a component in an angular speed direction of a motion vector.

Description of Operation of First Embodiment

Figure 2:
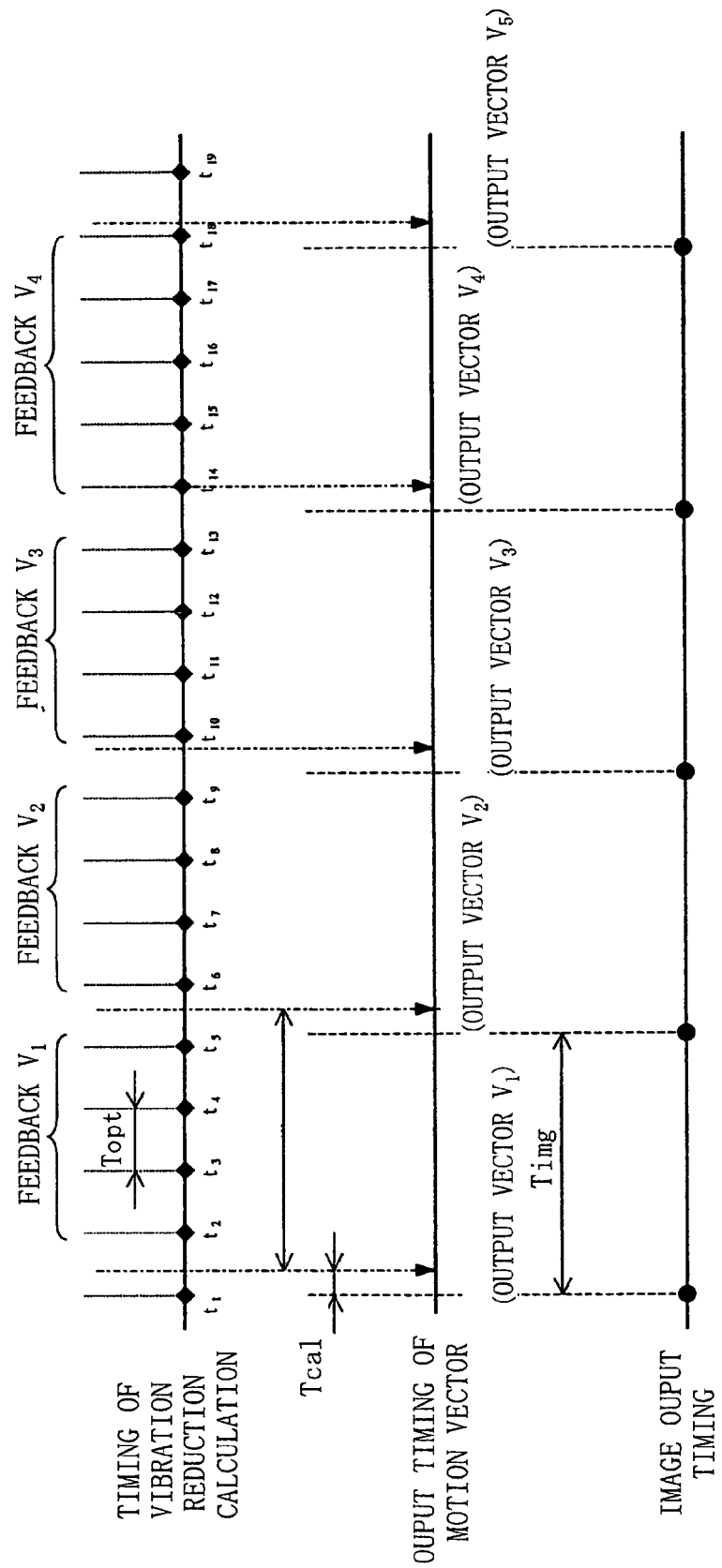
FIG. 2 is a schematic diagram showing timing of a vibration reduction operation.

FIG. 2 illustrates timing of a vibration reduction operation.

Figure 3:
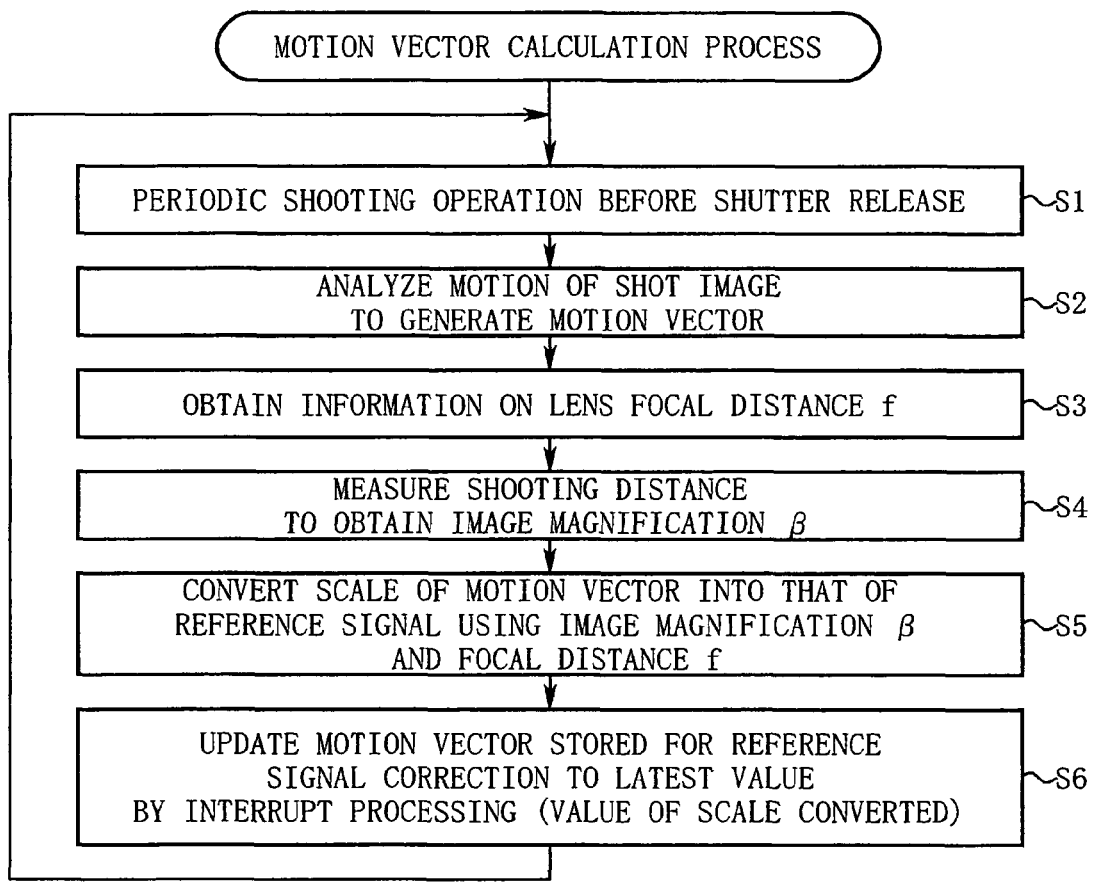
FIG. 3 is a flow chart showing a motion vector calculation process.

FIG. 3 is a flow chart showing a motion vector calculation process.

Figure 4:
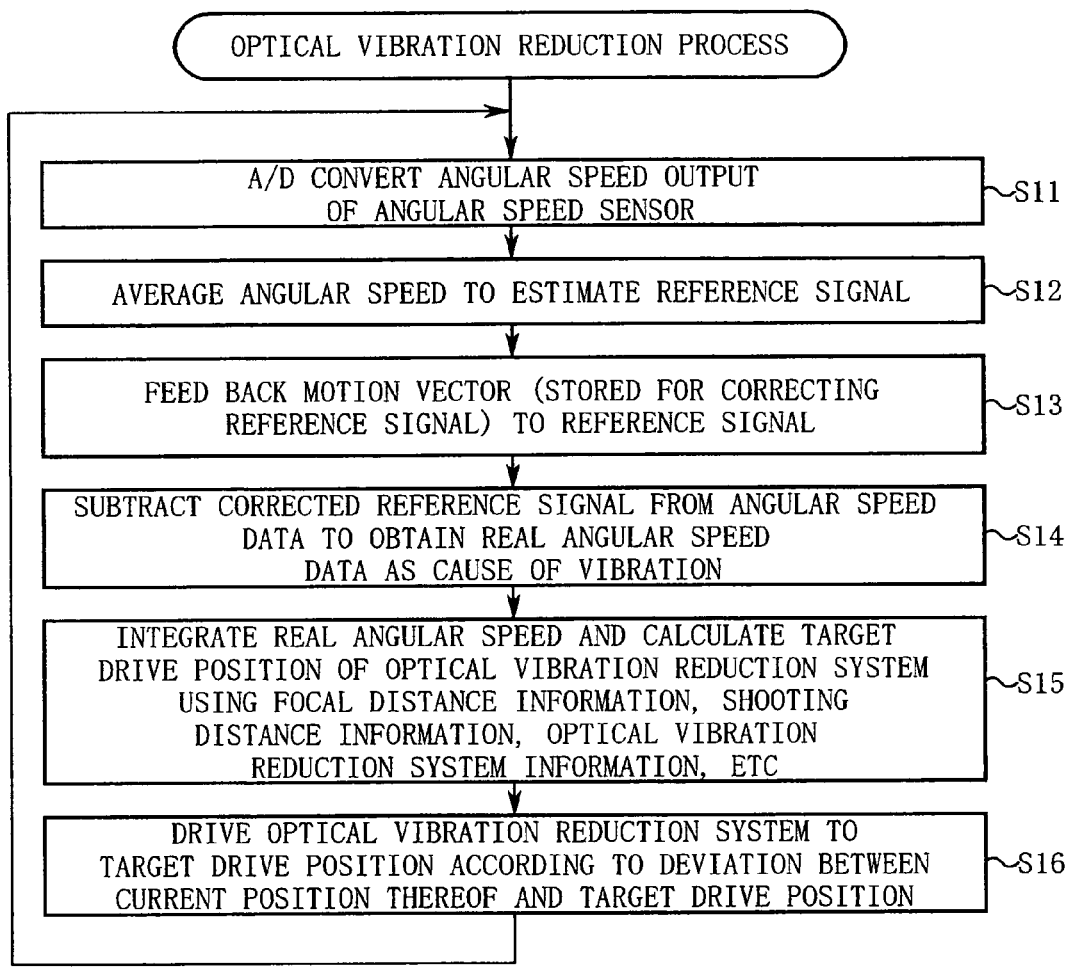
FIG. 4 is a flow chart showing an operation of a vibration reduction control.

FIG. 4 is a flow chart showing an operation of a vibration reduction control.

Next, with reference to these drawings, an operation of the first embodiment will be described.

First of all, as shown in FIG. 2, the image sensor 150 periodically outputs a captured image at a predetermined shooting interval Timg. A motion vector calculation processing (shown in FIG. 3) is executed at the shooting interval Timg. Next, the motion vector calculation process will be described.

Step S1: The image sensor 150 thins out lines of an image so as to read a captured image at high speed (30 frames/second) for a monitor display.

Step S2: The motion vector detecting part 160 obtains a motion vector of the image in accordance with the difference in frames of the captured image. For detecting a motion vector, a known method such as tempo-spatial gradient method or block matching method can be used.

A motion vector of an entire captured image may be obtained or alternatively, a motion vector of a partial area of a captured image may be obtained. In addition, a motion vector may be obtained in each of axis directions (for example, vertical direction and horizontal direction) of a vibration. In this case, a motion vector having elements as image motion in the individual axial directions (displacement between frames) can be obtained.

The direction and amount of the displacement of a captured image may be obtained as a motion vector by detecting the displacement between frames of the captured image in each of a plurality of directions.

Step S3: The motion vector converting part 170 obtains the focal distance information 120 of the shooting lens 190*a*.

Step S4: The motion vector converting part 170 obtains the shooting magnification information 130 of the shooting lens 190*a*.

Step S5: A motion vector output from the motion vector detecting part 160 represents information on displacement between frames of a captured image. Thus, the motion vector converting part 170 converts the scale of the motion vector into a scale of an angular speed the same as that of a reference signal. For example, the following conversion formula is used.

$$V' = G \cdot \tan^{-1} \frac{V}{f(1+\beta)^2} \cong G \cdot \frac{V}{f(1+\beta)^2} \quad (1)$$

where V represents a motion vector that has not been converted; V' represents a motion vector that has been converted; f represents a focal distance; β represents a shooting magnification; and G represents a constant.

Step S6: The motion vector converting part 170 updates a motion vector stored for correcting a reference signal to the latest value V' obtained at step s5.

The motion vector calculation process is completed, delaying from at the time of shooting as shown in FIG. 2 by the calculation time Tcal.

Next, with reference to FIG. 4, a vibration reduction control operation will be described.

Step S11: The A/D converting part 30 A/D converts an angular speed output of the angular speed sensor 10 at a sampling interval Topt.

Step S12: The reference signal calculating part 40 performs a moving average processing and a low-pass filter processing on the digital angular speed data so as to estimate a reference signal of the angular speed data.

Step S13: The reference signal calculating part 40 acquires information on the motion vector V' updated at step S6 from the motion vector converting part 170 and corrects the motion vector V' according to the following formula:

$$Wo' = Wo - Q \cdot v' \quad (2)$$

where Q represents a feedback gain of a motion vector; v' represents a component in the angular speed direction of the motion vector V' (converted into a scale of an angular speed). The value Q is decided in view of making the reference signal Wo' not excessive and shortening the time taken for setting the value.

Generally, an error in the reference signal Wo' results in a residual vibration of a captured image in the vibration reduction. The residual vibration is detected as a motion vector V'. The detected motion vector V' is fed back to the reference signal according to the formula (2), thereby decreasing the error in the reference signal Wo'.

As the error in the reference signal Wo' decreases, the motion vector V' gradually decreases. When the motion vector V' is reduced to almost zero, the reference signal Wo' will be an accurate value that contains a drift output and a DC offset of the angular speed sensor 10.

In the vibration reduction operation as shown in FIG. 2, the target drive position and the reference signal are updated at a sampling interval Topt shorter than the shooting interval Timg for the purpose of improving the performance of the optical vibration reduction system 100 to follow the target position. Thus, a new motion vector is not available every time the reference signal is corrected. Consequently, one motion vector V' is repeatedly used to correct the reference signal until a new motion vector is obtained.

Step S14: The target drive position calculating part 50 subtracts the corrected reference signal Wo' from angular speed data that is output from the A/D converting part 30 so as to obtain actual angular speed data as a cause of a vibration of an image.

Step S15: The target drive position calculating part 50 integrates the actual angular speed data so as to obtain a displacement amount of the angle against the optical axis of the shooting lens 190a. The target drive position calculating part 50 obtains a position in which the optical vibration reduction system 100 cancels the displacement of the focal position of the image of the subject according to the value of the angle from the optical axis (this position of the optical vibration reduction system 100 is referred to as target drive position).

The target drive position θ(T_k) is calculated according to the following formulas:

$$C = f \cdot (1+\beta)^2 / K \quad (3)$$

$$\theta(T_k) = \theta(T_{k-1}) + C \cdot [W(T_k) - Wo'] \quad (4)$$

where f represents a focal distance; β represents a shooting magnification; θ(T_{k-1}) represents a preceding target drive position; W(T_k) represents latest angular speed data; and K represents a vibration reduction coefficient. The vibration reduction coefficient K is pre-measured according to the following formula:

K=(displacement of image of subject)/(displacement of optical vibration reduction system 100).

Step S16: The drive signal calculating part 60 acquires information on the target drive position from the target drive position calculating part 50 so as to control the optical vibration reduction system 100 to follow the target drive position.

Effect and so Forth of First Embodiment

FIG. 5A, FIG. 5B, and FIG. 5C are schematic diagrams showing a simulation result of a vibration reduction operation according to the first embodiment.

When a motion vector is fed back to a reference signal shown in FIG. 5A, the reference signal accurately contains a DC offset and a drift output of the angular speed sensor 10. Specially, unlike with the conventional moving average method, a phase delay of the drift output can be accurately corrected.

In particular, a reference signal is a low frequency signal; therefore, it can be properly and stably corrected even by a motion signal with a long sampling interval. Even if a reference signal varies due to an external disturbance, feeding back a motion vector to the reference signal enables the reference value to be restored to a normal value. Thus, the robustness of a reference signal against an external disturbance is very high.

As a result, an error in a reference signal shown in FIG. 5B (an error in actual real angular speed data) is smaller than an error in a simulation result of a related art reference shown in FIG. 5B. The accuracy of a reference signal is improved so that a high vibration reduction effect as shown in FIG. 5C is obtainable. In addition, owing to a long update interval of the motion vector, the load of the system to calculate the motion vector is very low.

FIG. 6 illustrates a criterion of a vibration reduction performance according to the first embodiment. In the prior art (curves B and C shown in FIG. 6), the optical vibration reduction system 100 drifts as time elapses so that it is difficult to reduce the image vibration amount. In contrast, according to the first embodiment (curves D and E shown in FIG. 6), the drifting amount of the optical vibration reduction system 100 is small, so that it is able to reduce the image vibration amount during the exposure.

Supplementary Description of First Embodiment

Figure 7:
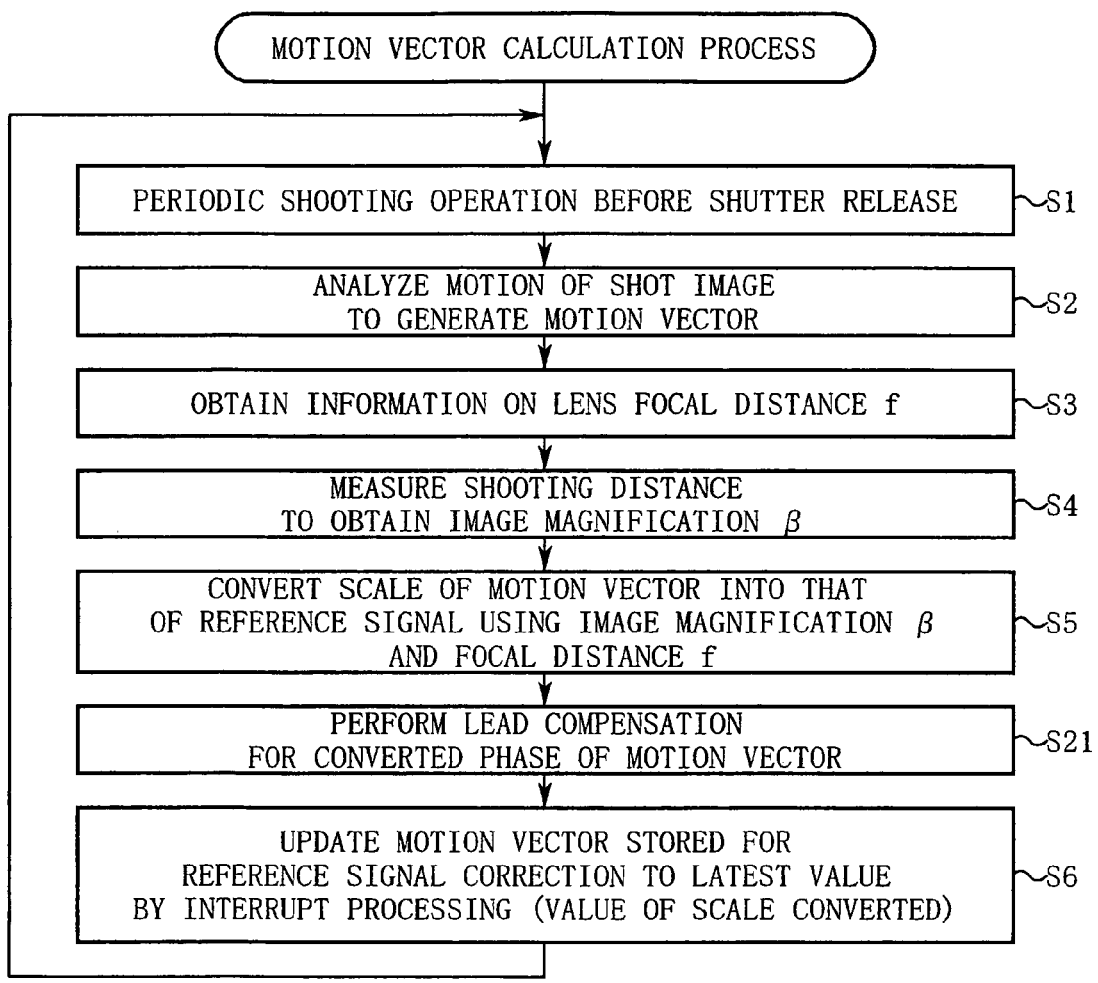
FIG. 7 is a flow chart showing a motion vector calculation process (including a lead compensation of the motion vector)

In the first embodiment, lead compensation may be made on the phase of a motion vector at step S21 shown in FIG. 7.

For example, the phase-compensated motion vector Vnow' is obtainable according to the following formula:

$$Vnow' = Vnow + S \cdot [Vnow - Vpre] \quad (5)$$

where Vnow represents a latest motion vector; Vpre represents a preceding motion vector; and S represents a constant.

By adjusting the constant S, a motion vector can be phase-compensated by the calculation time Tal shown in FIG. 2. In this case, the loss of the calculation time Tcal can be phase-compensated, resulting in further improving the correction accuracy of a reference signal.

Next, another embodiment of the present invention will be described.

Second Embodiment

Description of Structure of Second Embodiment

Figure 8:
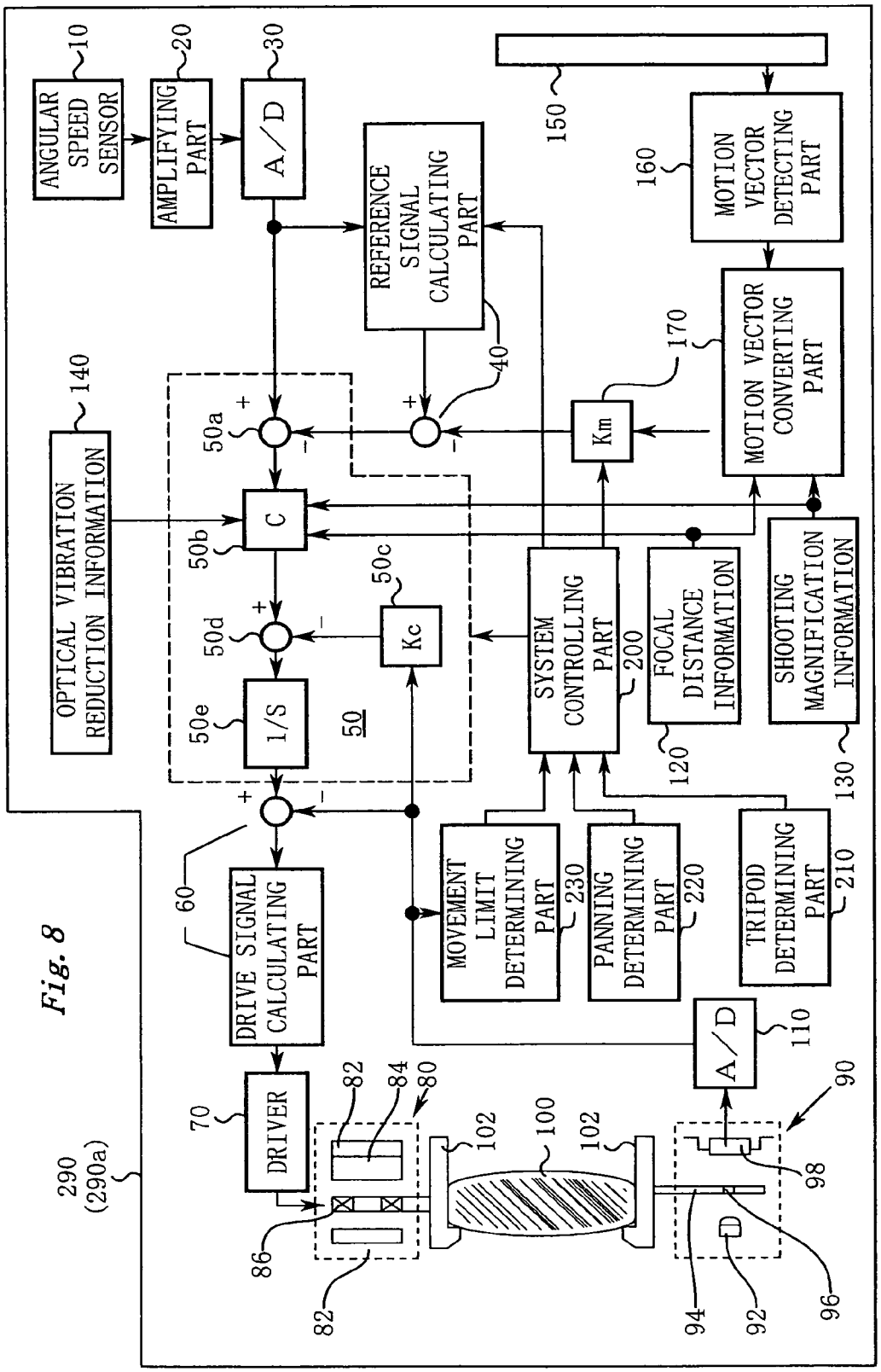
FIG. 8 is a schematic diagram showing the camera system 290 (including the shooting lens 290a)
Figure 9:
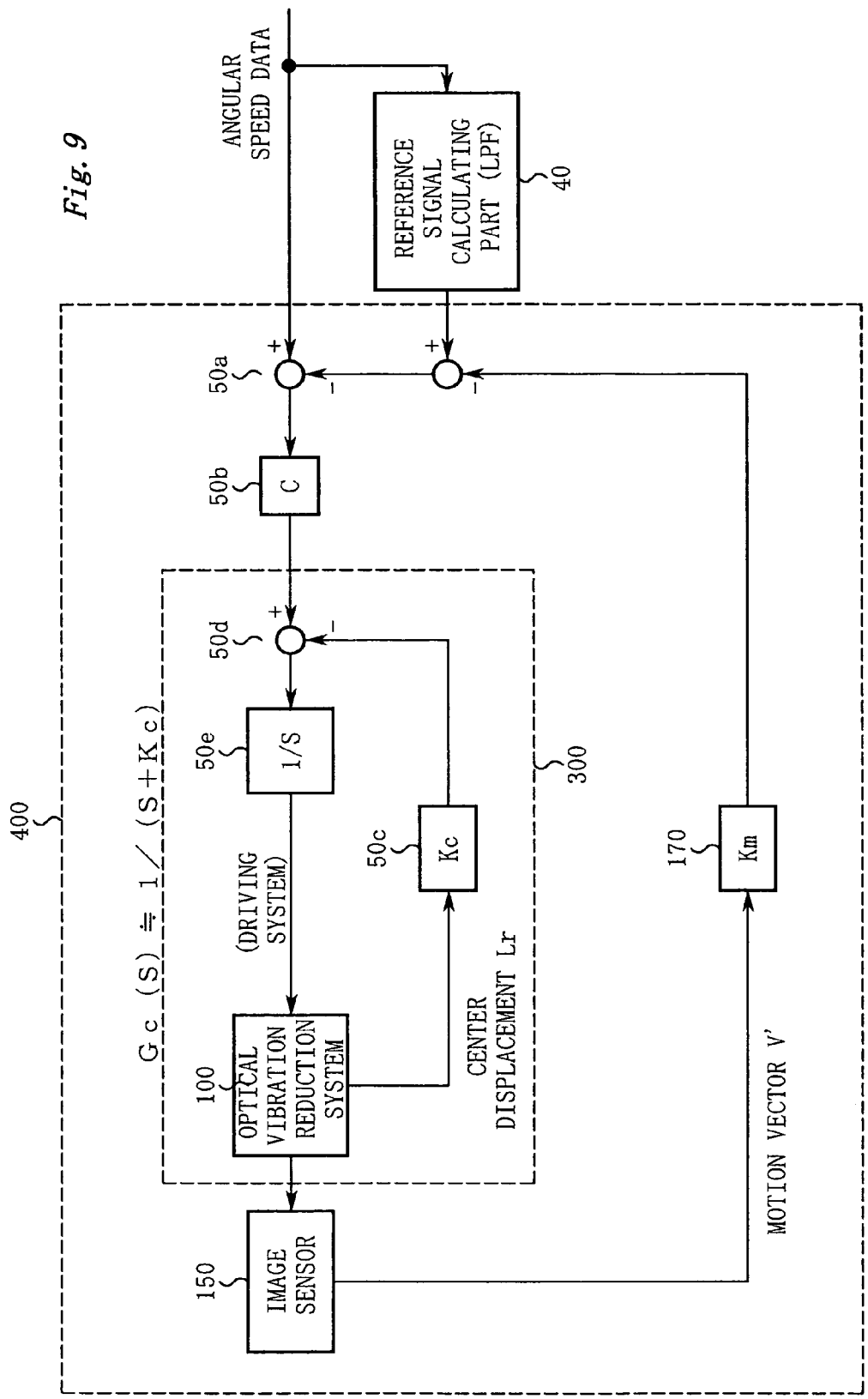
FIG. 9 is a block diagram showing a principal structure of a vibration reduction control system.

FIG. 8 is a schematic diagram showing a camera system 290 (including a shooting lens 290*a*) according to a second embodiment of the present invention. FIG. 9 is a block diagram showing a principal structure of a vibration reduction control system.

Next, with reference to FIG. 8 and FIG. 9, the structure of each part of the camera system 290 will be described. For simplicity, description of structural parts that are in common with the first embodiment (FIG. 1) will be omitted.

First of all, a target drive position calculating part 50 (in detail, a part denoted by reference numeral 50*a* in FIG. 8) subtracts a reference signal from angular speed data so as to obtain an actual angular speed as a cause of a vibration of an image.

The target drive position calculating part 50 (in detail, a part denoted by reference numeral 50*b* in FIG. 8) converts the actual angular speed into a scale of the moving amount of a optical vibration reduction system 100. The scale conversion is performed in accordance with focal distance information 120, shooting magnification information 130, and optical information 140 on the optical vibration reduction system 100.

In addition, the target drive position calculating part 50 (in detail, a part denoted by reference numerals 50*c* and 50*d* shown in FIG. 8) subtracts a value of which center displacement Lr of the optical vibration reduction system 100 is multiplied by a gain Kc from the scale converted angular speed. The optical vibration reduction system 100 is biased to the center by this operation.

The target drive position calculating part 50 (in detail, a part denoted by reference numeral 50*e* shown in FIG. 8) integrates the angular speed that has been center-biased so as to obtain a target drive position. The target drive position is a position at which the optical vibration reduction system 100 cancels a vibration of an image of a subject.

In addition, the shooting lens 290*a* is provided with a micro processing unit (MPU) that functions as a system controlling part 200. The system controlling part 200 is connected to a tripod determining part 210, a panning determining part 220, and a movement limit determining part 230.

The tripod determining part 210 determines whether or not the camera system 290 has been fixed by a tripod from an output of an angular speed sensor 10, an output of a sensor switch disposed at a tripod fixed position of the camera system 290, and so forth. The panning determining part 220 determines whether or not the camera system 290 is panning from an output of the angular speed sensor 10, a motion vector, and so forth. On the other hand, the movement limit determining part 230 determines whether or not the optical vibration reduction system 100 has moved to about its limit from an output of a positional sensor 90.

Next, the relation between the terminology used in claims and the terminology used in the second embodiment will be described. It should be noted that the relation represents only an example and does not limit the present invention.

A shooting lens as set forth in claims corresponds to the shooting lens 290*a*.

A vibration reduction mechanism as set forth in claims corresponds to the optical vibration reduction system 100.

A vibration detecting part as set forth in claims corresponds to the angular speed sensor 10.

An information obtaining part as set forth in claims corresponds to the motion vector converting part 170.

A controlling part as set forth in claims corresponds to a reference signal calculating part 40, a target drive position calculating part 50, a drive signal calculating part 60, a driver 70, a driving mechanism 80, the positional sensor 90, and the system controlling part 200.

A center bias part as set forth in claims corresponds to a function of the target drive position calculating part 50 for feeding back displacement Lr of the optical vibration reduction system 100 from the center thereto.

A sensor as set forth in claims corresponds to the tripod determining part 210, the panning determining part 220, and the movement limit determining part 230.

A reference signal estimating part as set forth in claims corresponds to a function for extracting a low frequency component of angular speed data so as to estimate a reference signal.

A reference signal correcting part as set forth in claims corresponds to a function for feeding back a motion vector to the reference signal.

A target drive position calculating part as set forth in claims corresponds to the target drive position calculating part 50.

A driving part as set forth in claims corresponds to the drive signal calculating part 60, the driver 70, the driving mechanism 80, and the positional sensor 90.

A camera system as set forth in claims corresponds to the camera system 290.

An image pickup part as set forth in claims corresponds to an image sensor 150.

A motion detecting part as set forth in claims corresponds to the motion vector detecting part 160.

A motion signal as set forth in claims corresponds to a component in an angular speed direction of a motion vector.

A vibration detection signal as set forth in claims corresponds to an angular speed detected by the angular speed sensor 10.

Description of Operation of Second Embodiment

Figure 10:
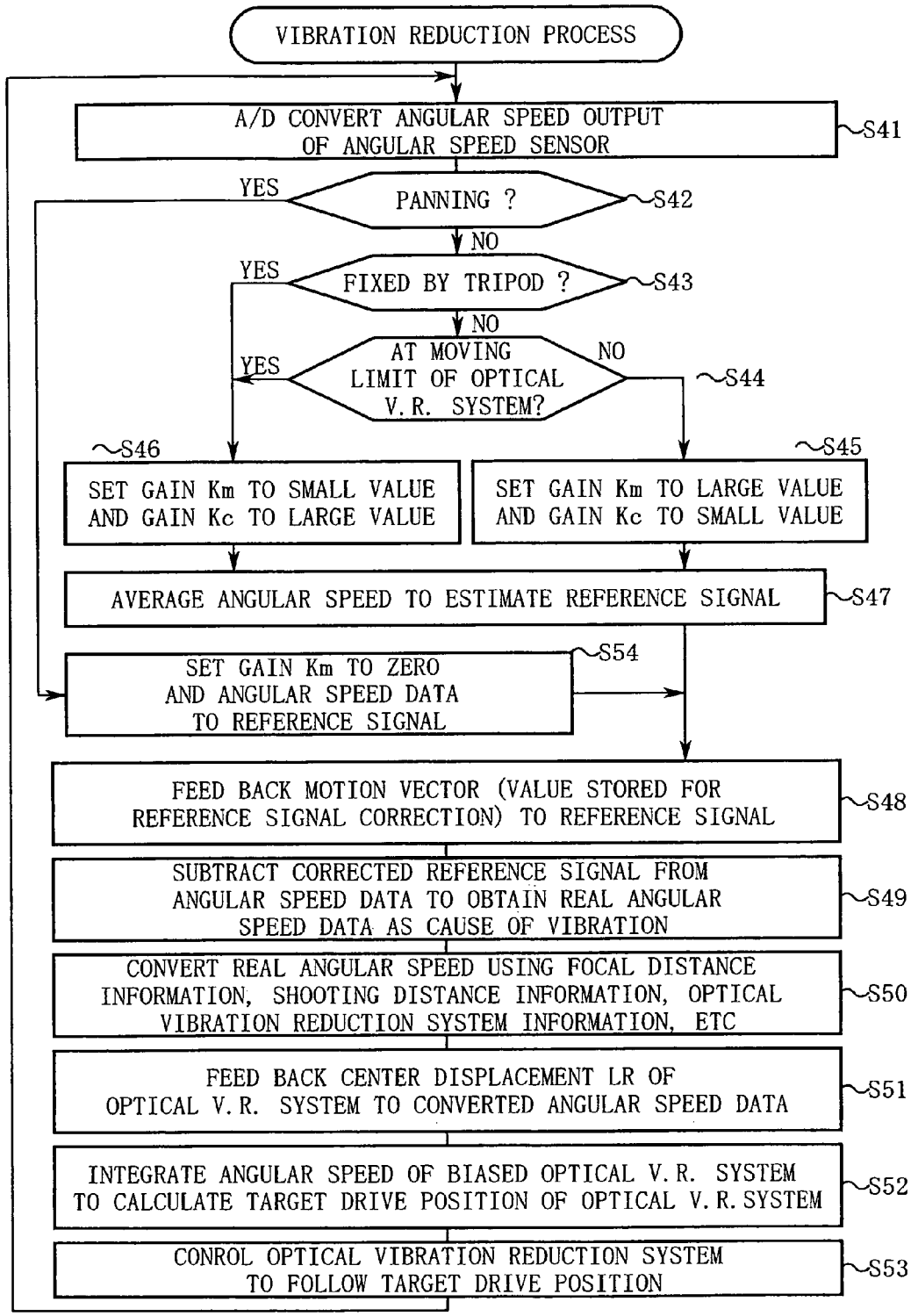
FIG. 10 is a flow chart showing a vibration reduction control operation.

FIG. 10 is a flow chart showing an operation of a vibration reduction control.

Next, with reference to FIG. 10, the operation of the vibration reduction control will be described.

Step S41: The A/D converting part 30 A/D converts an angular speed output of the angular speed sensor 10 at an update interval of a target drive position.

Step S42: When the panning determining part 220 has determined that the camera system 290 is panning, the system controlling part 200 causes the flow to advance to step S54. In contrast, when the panning determining part 220 has determined that the camera system 290 is not panning, the system controlling part 200 causes the flow to advance to step S43.

Step S43: When the tripod determining part 210 has determined that the camera system 290 is fixed by a tripod, the system controlling part 200 causes the flow to advance to step S46. In contrast, when the tripod determining part 210 has determined that the camera system 290 is not fixed by the tripod, the system controlling part 200 causes the flow to advance to step S44.

Step S44: When the movement limit determining part 230 has determined that the optical vibration reduction system 100 has moved to the limit, the system controlling part 200 causes the flow to advance to step S46. In contrast, when the movement limit determining part 230 has determined that the optical vibration reduction system 100 has not moved to the limit, the system controlling part 200 causes the flow to advance to step S45.

Step S45: Here, the camera system 290 is in a hand-held shooting state, therefore, the optical vibration reduction system 100 is movable. In this case, the system controlling part 200 sets a feedback gain Km of a motion vector to a large value (for example, Km=1). Thereafter, the system controlling part 200 sets a feedback gain Kc of a center bias to a small value (for example, kc=1 [deg/s/mm]). Thereafter, the system controlling part 200 causes the flow to advance to step S47.

Step S46: The camera system 290 is fixed by a tripod, or the optical vibration reduction system 100 has moved to about the limit. In this case, the system controlling part 200 sets the feedback gain Km of the motion vector to a small value (for example, Km=0.5). Thereafter, the amplifying part 20 sets the feedback gain Kc of the center bias to a large value (for example, Kc=10 [deg/s/mm]). Thereafter, the system controlling part 200 causes the flow to advance to step S47.

Step S47: The reference signal calculating part 40 performs a moving average processing and a low-pass filter processing on A/D converted angular speed data so as to estimate a reference signal Wo of the angular speed data.

Step S48: The reference signal calculating part 40 acquires information on a motion vector V' from the motion vector converting part 170 and corrects the reference signal Wo according to the following formula. The motion vector V' is the same as the motion vector V' obtained in the first embodiment (at step S6 shown in FIG. 3).

$$Wo' = Wo - Km \cdot v' \quad (10)$$

where v' represents a component in an angular speed direction of the motion vector V'.

Generally, an error in the reference signal Wo' leads to a residual vibration in a captured image in the vibration reduction operation. The residual vibration is detected as the motion vector V'. Feeding back the motion vector V' to the reference signal according to the foregoing formula (10) makes it possible to decrease the error in the reference signal Wo'.

As the error in the reference signal Wo' decreases, the residual vibration of the motion vector V' decreases. When the motion vector V' is reduced to almost zero, the reference signal Wo' will be an accurate value that contains a drift output and a DC offset of the angular speed sensor 10.

In the vibration reduction, the target drive position and the reference position are updated at a sampling interval shorter than an update interval of the motion vector so as to improve the performance of the optical vibration reduction system 100 to follow the target position. Thus, a new motion vector is not available every time the reference signal is corrected. Consequently, until a new motion vector is obtained, the current motion vector V' is repeatedly used for correction of the reference signal.

Step S49: The target drive position calculating part 50 subtracts the corrected reference signal Wo' from the angular speed data that is output from the A/D converting part 30 so as to obtain actual angular speed data as a cause of a vibration of an image.

Step S50: The target drive position calculating part 50 converts the scale of the actual angular speed data according to the following formulas:

$$C = f \cdot (1+\beta)^2 / K \quad (11)$$

$$W_1(T_k) = C \cdot [W(T_k) - Wo'] \quad (12)$$

where f represents a focal distance; β represents a shooting magnification; $W(T_k)$ represents angular speed data; $W_1(T_k)$ represents angular speed data of the converted scale; and K represents a vibration reduction coefficient. The vibration reduction coefficient K is pre-measured according to the following formula:

K=(displacement of image of subject)/(displacement of optical vibration reduction system 100).

Step S51: The target drive position calculating part 50 feeds back center displacement Lr of the optical vibration reduction system 100 to the angular speed data W1(Tk) of the converted scale according to the following formula. This processing causes a bias power (a kind of a center bias) to occur in the optical vibration reduction system 100. The bias power biases the optical vibration reduction system 100 to its center position.

$$W_2(T_k) = W_1(T_k) - Kc \cdot Lr \quad (13)$$

where Kc represents a feedback gain of the center bias.

Step S52: The target drive position calculating part 50 integrates the angular speed data $W_2(T_k)$ of the optical vibration reduction system 100 that has been center-biased according to the following formula so as to obtain a target drive position $\theta(T_k)$:

$$\theta(T_k) = \theta(T_{k-1}) + Ct \cdot W_2(T_k) \quad (14)$$

where $\theta(T_{k-1})$ represents a preceding target drive position; and Ct represents a constant for an integration interval ($T_k - T_{k-1}$).

The target drive position $\theta(T_k)$ represents a position in which the optical vibration reduction system 100 properly cancels a vibration of an image of a subject.

Step S53: The drive signal calculating part 60 acquires information on the target drive position $\theta(T_k)$ from the target drive position calculating part 50 so as to control the optical vibration reduction system 100 to follow the target drive position $\theta(T_k)$. These steps are cyclically repeated so as to reduce the vibration of the image.

Step S54: The camera system 290 is panning. In this case, it is preferred that the vibration reduction operation in the panning direction should be stopped so that it does not disturb user's panning operation. Thus, the system controlling part 200 stops the vibration reduction operation in the panning direction in the following order:

(1) Sets the feedback gain Km of the motion vector to zero; and (2) causes the reference signal calculating part 40 to output the angular speed data as the reference signal and stops a feedforward control with the angular speed data.

Such an operation causes the angular speed data W1(Tk) of the foregoing formula (12) to be cancelled. As a result, the optical vibration reduction system 100 is only center-biased. Consequently, the optical vibration reduction system 100 is moved to almost its center position so as not to disturb the user's panning.

Effect and so Forth of Second Embodiment

Next, an effect of the second embodiment will be described with reference to a main structure of the controlling system shown in FIG. 9.

A block 300 shown in FIG. 9 is a feedback system that center biases the optical vibration reduction system 100. A transfer function Gc(s) of the block 300 is given by the following formula assuming that a transfer characteristic of the driving system of the optical vibration reduction system 100 is almost "1".

$$Gc(S) \fallingdotseq 1/(S+Kc) \qquad (7)$$

Figure 11:
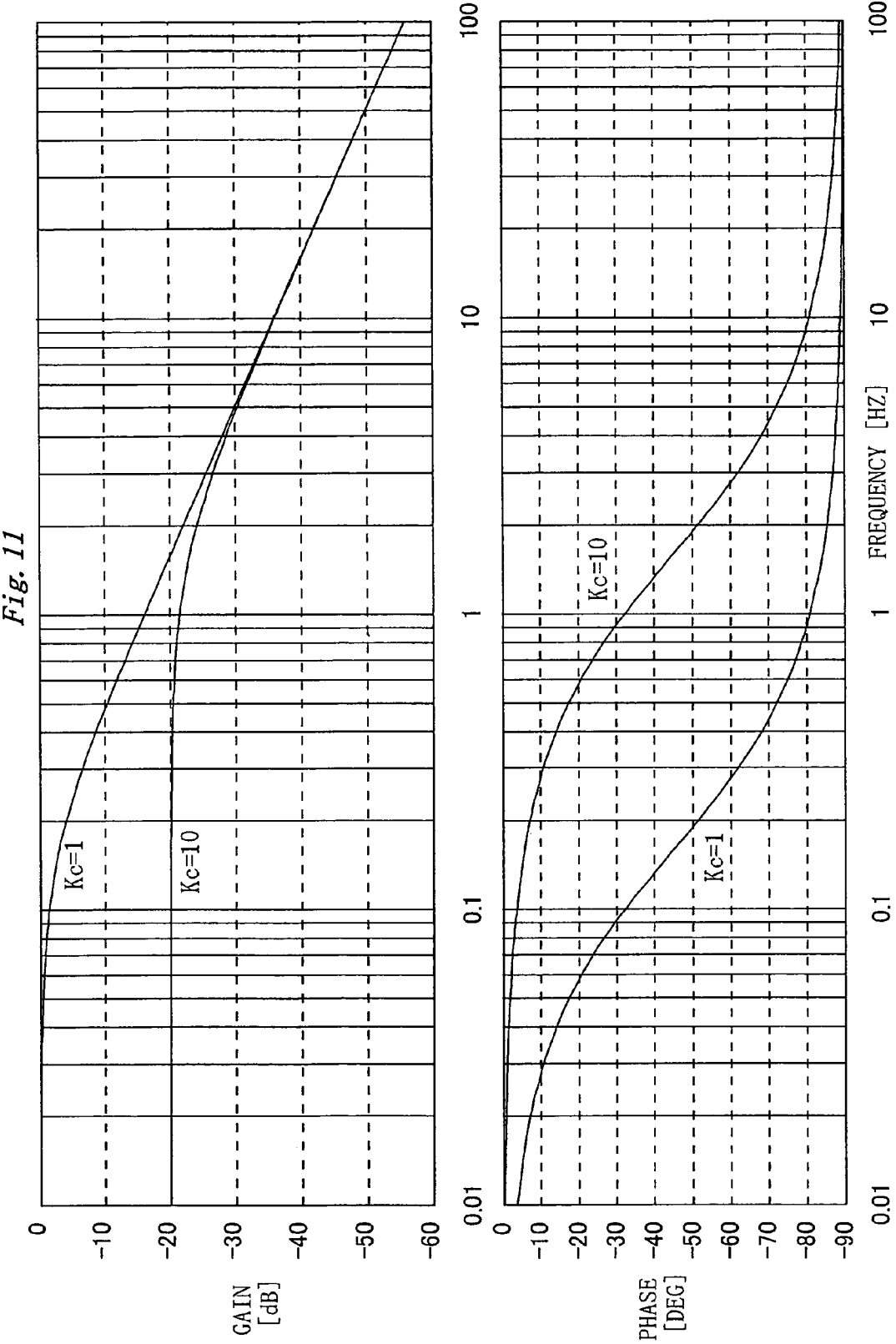
FIG. 11 is a graph showing a gain characteristic and a phase characteristic of a transfer function Gc(S)
Figure 12:
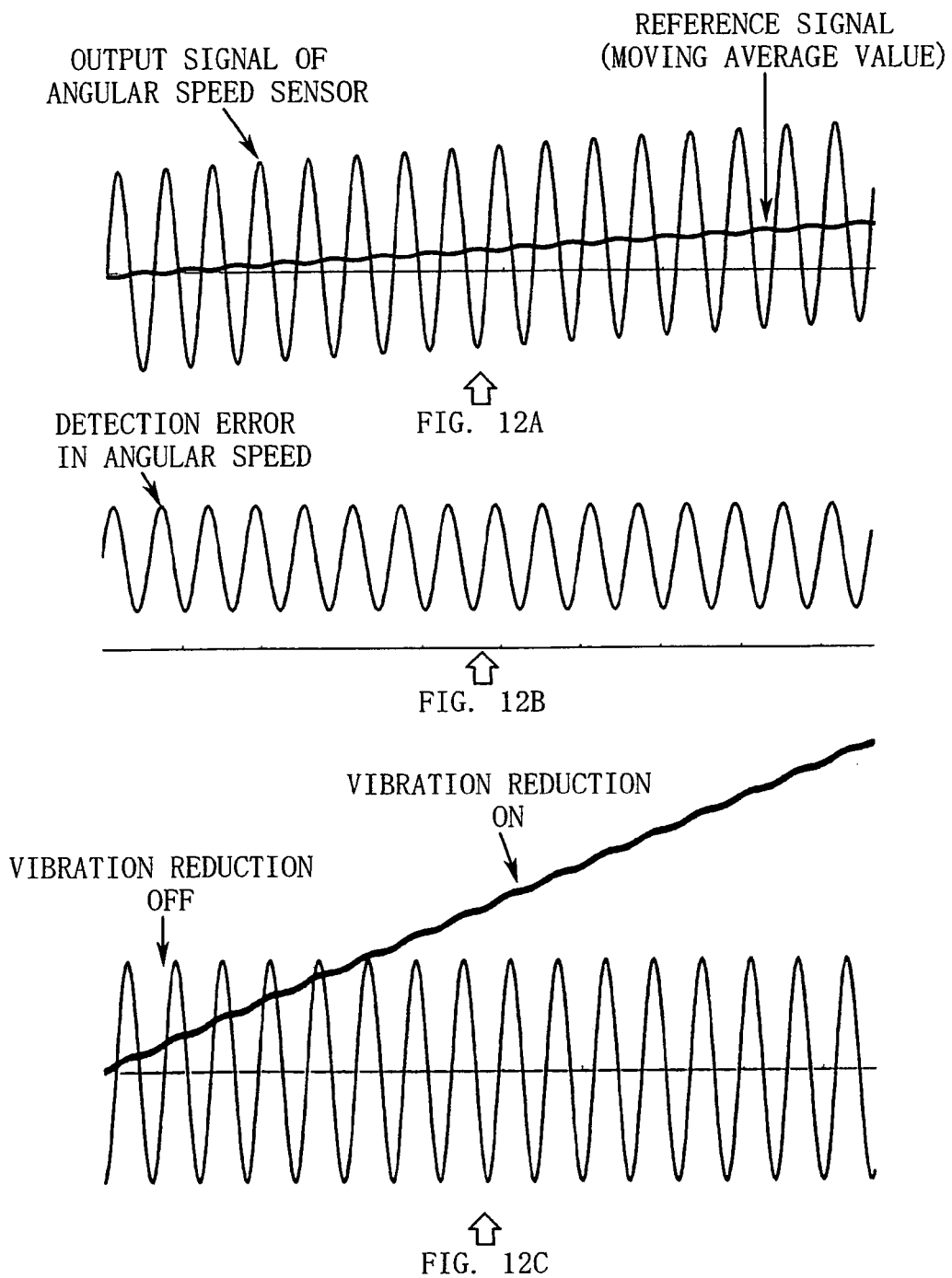
FIG. 12 is a schematic diagram showing a simulation result of a conventional vibration reduction control.

In other words, the block 300 is a transfer element of a first order lag. FIG. 11 is a schematic diagram showing a gain characteristic and a phase characteristic of the transfer function Gc(S).

A block 400 shown in FIG. 9 is a feedback system for the motion vector V'. The block 400 is a large system that contains the block 300 that center biases the optical vibration reduction system 100 as a forward transfer element. Thus, a characteristic of an open loop transfer function of the large block 400 can be adjusted by the foregoing transfer function Gc(S).

According to the second embodiment, for adjusting the characteristic the following balance adjustment is performed.

(1) While the camera system 290 is in a hand-held shooting state and the optical vibration reduction system 100 is movable.

According to the second embodiment, while the camera system 290 is in a hand-held shooting state and the optical vibration reduction system 100 is movable, the feedback gain Kc is decreased (step S45).

As shown in FIG. 11, the low pass gain of the open loop transfer function of the block 300 increases by decreasing the feedback gain Kc of the block 300. In this case, the amount of a low frequency component of the angular speed that passes though the block 300 increases, resulting in suppressing a vibration of an image of a lower frequency component.

However, in this state, a larger drift amount of a low frequency component of the angular speed sensor 10 passes through the block 300. As a result, the drift results in increasing the influence of the external disturbance. This will cause a trouble that the optical vibration reduction system 100 unnecessarily moves.

Thus, according to the second embodiment, at step S45, the feedback gain Km of the motion vector is increased before the feedback gain Kc is decreased. A drift of a low frequency component of the angular speed sensor 10 results in a residual vibration of a captured image. The residual vibration can be detected as a motion vector. Increasing the feedback gain Km of the motion vector makes it possible to improve the correction accuracy of the reference signal and to decrease the amount of a low frequency component as a drift.

Accordingly, it is able to prevent the drift due to a decrease of the feedback gain Kc from increasing and prevent the vibration reduction performance from deteriorating against the external disturbance.

(2) When the camera system 290 is fixed by a tripod or the optical vibration reduction system 100 has moved to its limit.

According to the second embodiment, when the camera system 290 is fixed by a tripod or the optical vibration reduction system 100 has moved to its limit, the feedback gain Kc of the center bias is increased (at step S46).

As a result, a center bias power strongly acts on the optical vibration reduction system 100. Consequently, the optical vibration reduction system 100 can be quickly returned from the limit position to its center position.

In addition, as shown in FIG. 11, as the gain Kc increases, the amount of a low frequency component that passes through the block 300 decreases. As a result, it is possible to sufficiently suppress unintentional movement of the optical vibration reduction system 100 due to a drift.

On the other hand, since the feedback gain Kc is increased, a phase margin of a vibration reduction operation decreases. In addition, the center bias power strongly acts on the optical vibration reduction system 100 so that a captured image moves fast, which likely causes a large motion vector with a phase delay. Because of this the stability of the vibration reduction control deteriorates. As a result, the optical vibration reduction system 100 is likely to overshoot or oscillate.

According to the second embodiment, at step S46 the feedback gain Km of the motion vector is decreased before the feedback gain Kc is increased. This can widen the phase margin or gain margin of the vibration reduction operation. Consequently, overshooting or oscillation of the optical vibration reduction system 100 can be surely avoided.

(3) When the camera system 290 is panning

According to the second embodiment, when the system controlling part 200 has determined that the camera system 290 is panning, angular speed data is output as a reference signal. As a result, the cancellation of the angular speed data can stop the feedforward control over the angular speed. In this case, before the feedforward control is stopped, the feedback gain of the motion vector is set to zero. Such a step-by-step operation can prevent unnecessary movement of the optical vibration reduction system 100 because the feedback of the motion vector occurs while the feedforward control is stopped.

In particular, according to the second embodiment, the optical vibration reduction system 100 is only center-biased with the vibration reduction control stopped. If the motion vector is fed back, the center bias and the motion vector alternately work on the optical vibration reduction system 100, preventing it from returning to its center position or from having it in vibration. However, stopping the feedback of the motion vector in advance can prevent such a problem according to the second embodiment.

Supplementary Description of Second Embodiment

According to the second embodiment, while the system controlling part 200 determines whether or not the camera system 290 is fixed by a tripod or the optical vibration reduction system 100 has moved to its limit, the vibration reduction operation may be stopped. In this case, it is preferable that the feedback gain of the motion signal should be set to zero prior to the start of the feedforward control. Such a preparing operation can prevent the vibration reduction mechanism from unnecessarily moving.

Moreover, according to the second embodiment, the motion vector is fed back to the reference signal. However, the present invention is not limited to such an embodiment. Alternatively, the motion vector may be fed back for the target drive position or angular velocity.

Third Embodiment

Description of Structure of Third Embodiment

Figure 13:
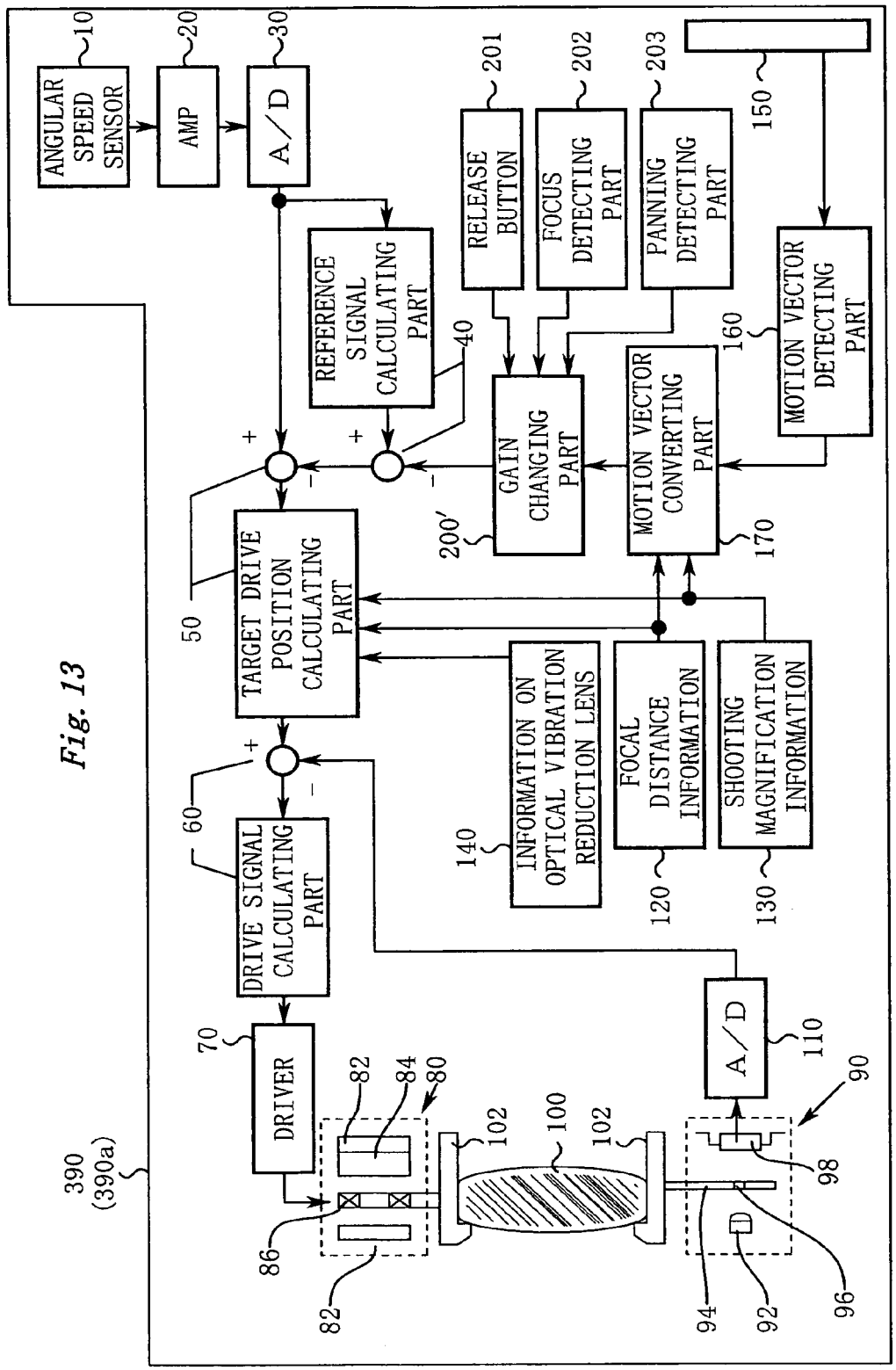
FIG. 13 is a schematic diagram showing a camera system 390 (including a shooting lens 390a)

FIG. 13 is a schematic diagram showing a camera system (including a shooting lens 390a).

Next, with reference to FIG. 13, the structure of each part of the camera system 390 will be described. For simplicity, description of structural parts that are in common with the first embodiment (FIG. 1) will be omitted.

The third embodiment features a structure of which a gain changing part 200' is disposed. The gain changing part 200' adjusts the gain of a motion vector.

Connected to the gain changing part 200' is a release button 201, a focus detecting part 202 that determines whether or not a subject is focused, and a panning detecting part 203 that determines whether or not the camera is panning.

Relation Between the Claims and the Third Embodiment

Next, the relation between the terminology used in claims and the terminology used in the third embodiment will be described. It should be noted that the relation represents only an example, but does not limit the present invention.

A vibration reduction mechanism as set forth in claims corresponds to the optical vibration reduction system 100.

A vibration detecting part as set forth in claims corresponds to the angular speed sensor 10.

A reference signal generating part as set forth in claims corresponds to the reference signal calculating part 40, the motion vector converting part 170, and the gain changing part 200'.

A target drive position calculating part as set forth in claims corresponds to the target drive position calculating part 50.

A driving part as set forth in claims corresponds to the drive signal calculating part 60, the driver 70, the driving mechanism 80, and the positional sensor 90.

A feedback path as set forth in claims corresponds to the motion vector converting part 170, and the "function for feeding back the motion signal to the reference signal" of the reference signal calculating part 40.

A gain changing part as set forth in claims corresponds to the gain changing part 200'.

A camera system as set forth in claims corresponds to the camera system 390.

A motion signal as set forth in claims corresponds to a component in an angular speed direction of a motion vector.

[Control Operation of Optical Vibration Reduction]

Figure 14:
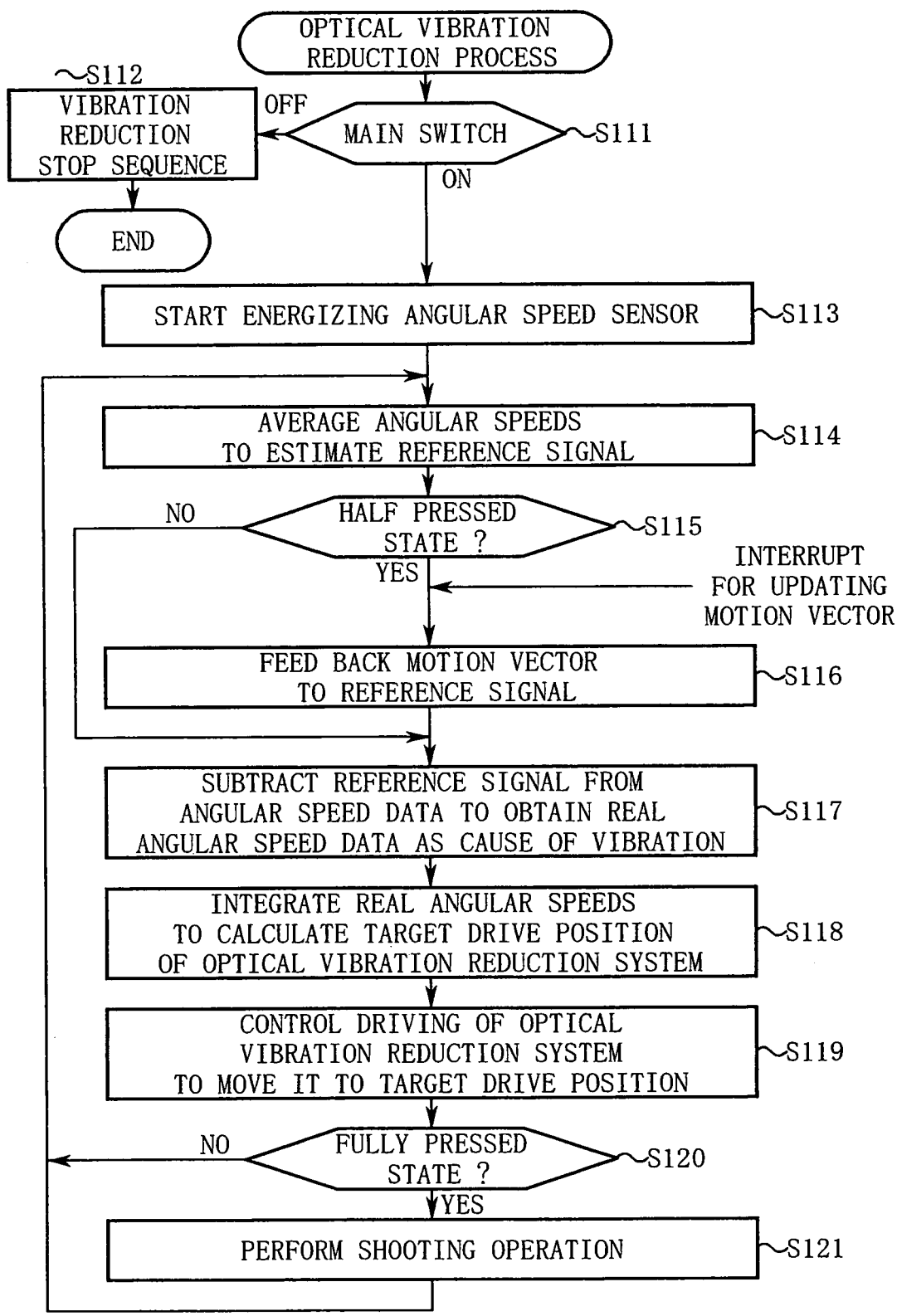
FIG. 14 is a flow chart showing optical vibration reduction according to a third embodiment of the present invention.

FIG. 14 is a flow chart showing an operation of the third embodiment.

Next, with reference to FIG. 14, a control operation of the optical vibration reduction will be described.

Step S111: When a main switch (not shown) is turned on, the camera system 390 starts controlling the vibration reduction. Thereafter, the camera system 390 causes the flow to advance to step S113.

In contrast, when the main switch is turned off, the camera system 390 causes the flow to advance to step S112. At step S112, the camera system 390 executes a vibration reduction stop sequence.

Step S112: The camera system 390 executes the stop sequence in the following order so as to stably stop the optical vibration reduction system 100 that is operating.
(1) stops driving the vibration reduction lens.
(2) stops calculating the lens drive signal.
(3) stops calculating the target drive position.
(4) stops processing the angular speed data.
(5) stops updating the motion vector.
(6) stops calculating the reference signal.
(7) stop energizing the angular speed sensor 10.

After completing the foregoing stop sequence, the camera system 390 completes the vibration reduction operation.

Step S113: When the main switch is turned on, the camera system 390 starts energizing the angular speed sensor 10.

Step S114: The A/D converting part 30 converts an angular speed output as an analog signal into a digital signal at predetermined sampling intervals. The reference signal calculating part 40 performs a moving average processing and a low-pass filter processing on the digital angular speed data so as to estimate a reference signal Wo of the angular speed data. Alternatively, the reference signal calculating part 40 may perform a weighted addition for the reference signal Wo with a previous signal of a corrected reference signal Wo' (that will be described later) so as to reflect the past corrected contents to the reference signal Wo.

Step S115: The gain changing part 200' determines whether or not the release button 201 is half pressed from a contact state of the release button 201 (namely, a half-press contact point of the release button 201 is on).

When the release button 201 is not half pressed, the gain changing part 200' does not feed back a motion vector V' to the reference signal, but causes the flow to advance to step S117.

In contrast, when the release button 201 is half pressed, the gain changing part 200' causes the flow to advance to step S116.

Supposing that in a predetermined period after the half-pressed state is cancelled, the user may half press the release button 201 immediately, it is preferred that the gain changing part 200' should cause the flow to advance to step S116.

Step S116: When the release button 201 is half pressed, the camera system 390 starts a shooting preparation for deciding automatic exposure (AE) and so forth, for example.

After the start of the shooting preparation, the gain changing part 200' starts feeding back the motion vector V' to the reference signal.

In other words, the gain changing part 200' obtains information of the motion vector V' at step S6 (FIG. 3) and subtracts the motion vector V' from the reference signal Wo.

This feedback causes the corrected reference signal Wo' to be generated according to the following formula.

$$Wo' = Wo - \gamma \cdot v' \qquad (22)$$

where γ represents a feedback gain; v', a component in an angular speed direction of motion vector V' (in the unit of angular speed).

Step S117: The target drive position calculating part 50 subtracts the reference signal from the angular speed data that is output from the A/D converting part 30 and obtains real angular speed data (corresponding to a vibration component) that is a cause of image vibration.

Step S118: The target drive position calculating part 50 integrates the real angular speed data to obtain a displacement amount of an angle of the optical axis of the shooting lens 390*a*. The target drive position calculating part 50 obtains the position of the optical vibration reduction system 100 necessary for canceling the displacement of the focused position of the image of the subject corresponding to the displacement amount of the angle of the optical axis (the position of the optical vibration reduction system 100 is referred to as target drive position).

For example, with the foregoing formulas (3) and (4), the target drive position calculating part 50 calculates the target drive position θ(Tk).

Step S119: The drive signal calculating part 60 obtains information of the target drive position from the target drive position calculating part 50 and controls the optical vibration reduction system 100 so as to follow up the target drive position.

Step S120: The camera system 390 determines whether or not the release button 201 is fully pressed (both the half-press and fully-press contact points of the release button 201 are on).

When the release button 201 is not fully pressed, the camera system 390 causes the flow to return to step S114.

In contrast, when the release button 201 is fully pressed, the camera system 390 causes the flow to advance to step S121. Step S121: When the release button 201 is fully pressed, the camera system 390 starts a shooting operation. After the camera system 390 starts the shooting operation, the camera system 390 causes the flow to return to step S114. As a result, while performing the shooting operation, the camera system 390 continuously performs the vibration reduction.

Effect and so forth of Third Embodiment

According to the third embodiment, when the release button 201 is half pressed, it is determined that the shooting preparation should start and the motion vector V' should be fed back to the reference signal.

Generally, in the half-pressed state the user stands by for a good shooting timing, so that it is not likely that the user intentionally is moving the camera. Consequently, feeding back the motion vector V' to the reference signal immediately after the release button 201 is half pressed can greatly prevent occurrence of undesired events that the user's intentional panning erroneously affects the reference signal.

Thus, before the release button 201 is half pressed, even if the user greatly moves the camera to decide a composition of an image to be shot, the reference signal can be estimated without an error. This prevents occurrence of such troubles that the motion of an image unnaturally stops and vibration reduction becomes unstable at worst.

In this embodiment, timing at which the shooting preparation starts is detected when the release button is half pressed. However, the present invention is not limited to this operation. For example, if the camera has a self timer function, the shooting preparation may be started when the self timer starts. Generally, after the self timer starts, the user will not move the camera. Thus, feeding back the motion vector V' is to the reference signal after the start of the self timer can prevent occurrence of undesired events that the user's intentional panning erroneously affects the reference signal.

In this embodiment, the motion vector is fed back in synchronization with the startup of the shooting preparation. However, the present invention is not limited thereto. For example, the gain changing part 200' may increase the feedback gain to increase the feedback instead of starting the feedback of the motion vector. In this case, it is possible to finely set or change the sensitivity to correct the reference signal before and after the start of the shooting preparation.

Next, another embodiment of the present invention will be described.

Fourth Embodiment

Since the structure of an apparatus of the fourth embodiment is the same as that of the third embodiment (FIG. 13), the description will be omitted.

Figure 15:
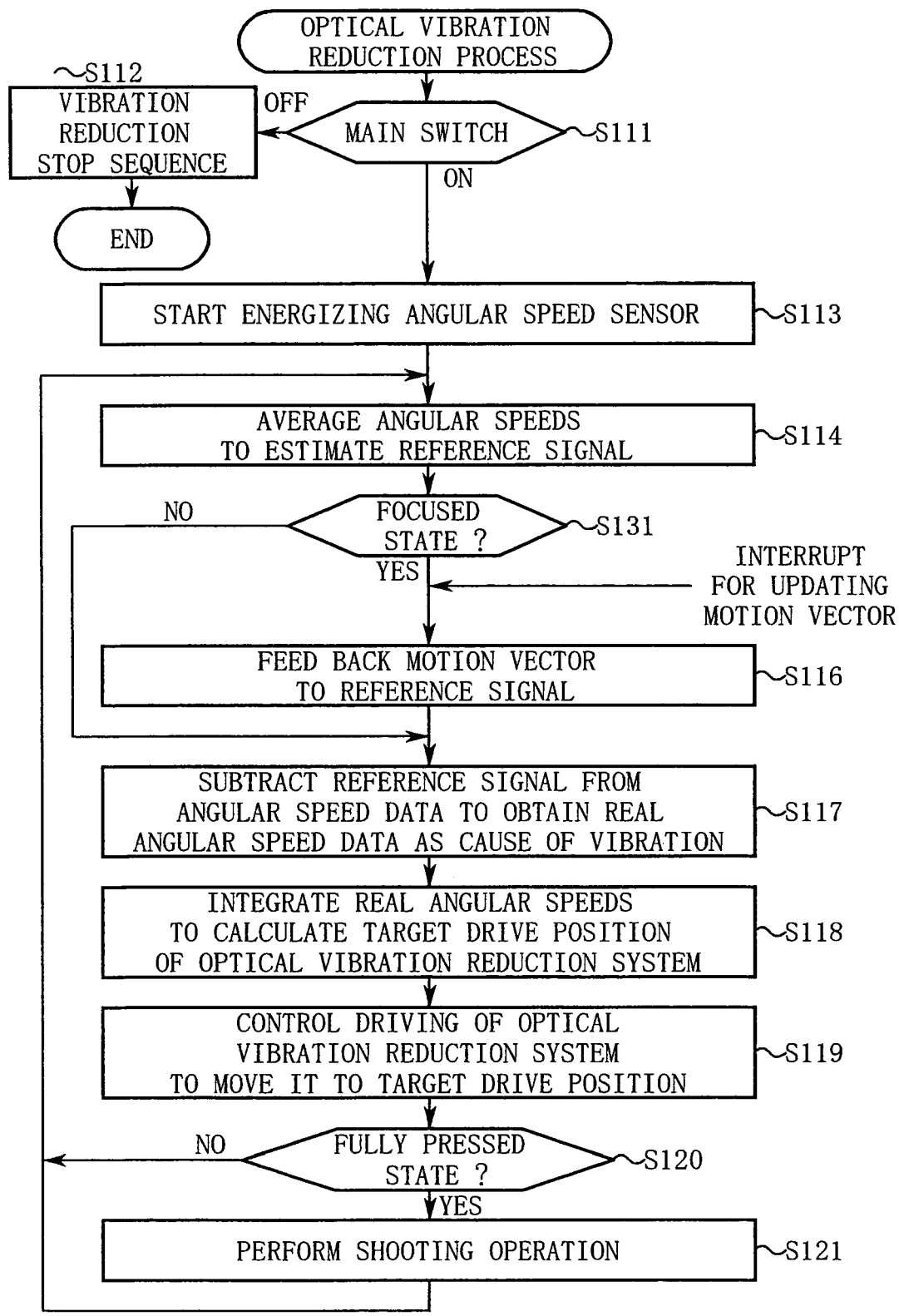
FIG. 15 is a flow chart showing optical vibration reduction according to a fourth embodiment of the present invention.

FIG. 15 is a flow chart showing optical vibration reduction according to the fourth embodiment. The fourth embodiment features a structure of which step S115 of the third embodiment (FIG. 14) is replaced with step S131 shown in FIG. 15.

At step S131, a gain changing part 200' obtains a result of whether or not a subject is focused from a focus detecting part 202.

For example, according to a known contrast climbing method the focus detecting part 202 determines that a subject is into focus when the contrast of a monitored image is close to its peak.

According to a known phase difference detecting method, the focus detecting part 202 determines that a subject is into focus, when the defocus amount is in a permissible range.

When by these methods the focus detecting part 202 determines that the subject is not focused, the gain changing part 200' does not feed back the motion vector V' to the reference signal, but causes the flow to advance to step S117.

In contrast, when the subject is focused, the gain changing part 200' causes the flow to advance to step S116.

Thus, with the operation of the fourth embodiment, even if the user greatly moves the camera to decide a composition of an image to be shot, it is able to surely prevent occurrence of such troubles that the reference signal is erroneously corrected.

In addition, since a motion vector is obtained with a clearly focused image, the motion vector is detected with higher accuracy. As a result, the reference signal can be corrected more accurately.

It can be supposed that immediately after a subject is focused, the user may adjust a composition of an image to be shot. Thus, it is preferred that the feedback of the motion vector V' should be started after a predetermined period has elapsed after the subject is focused (namely, after an estimated period for which a composition of an image to be shot is adjusted).

According to this embodiment, the feedback of the motion vector is started in accordance with the determined result of the focused state. However, the present invention is not limited to this operation. Alternatively, the gain changing part 200' may increase the feedback gain to increase the feedback instead of starting the feedback of the motion vector. In this case, before and after the subject is focused, the sensitivity of the correction of the reference signal can be finely set and changed.

Next, another embodiment of the present invention will be described.

Fifth Embodiment

Since the structure of an apparatus of the fifth embodiment is the same as that of the third embodiment (FIG. 13), the description will be omitted.

Figure 16:
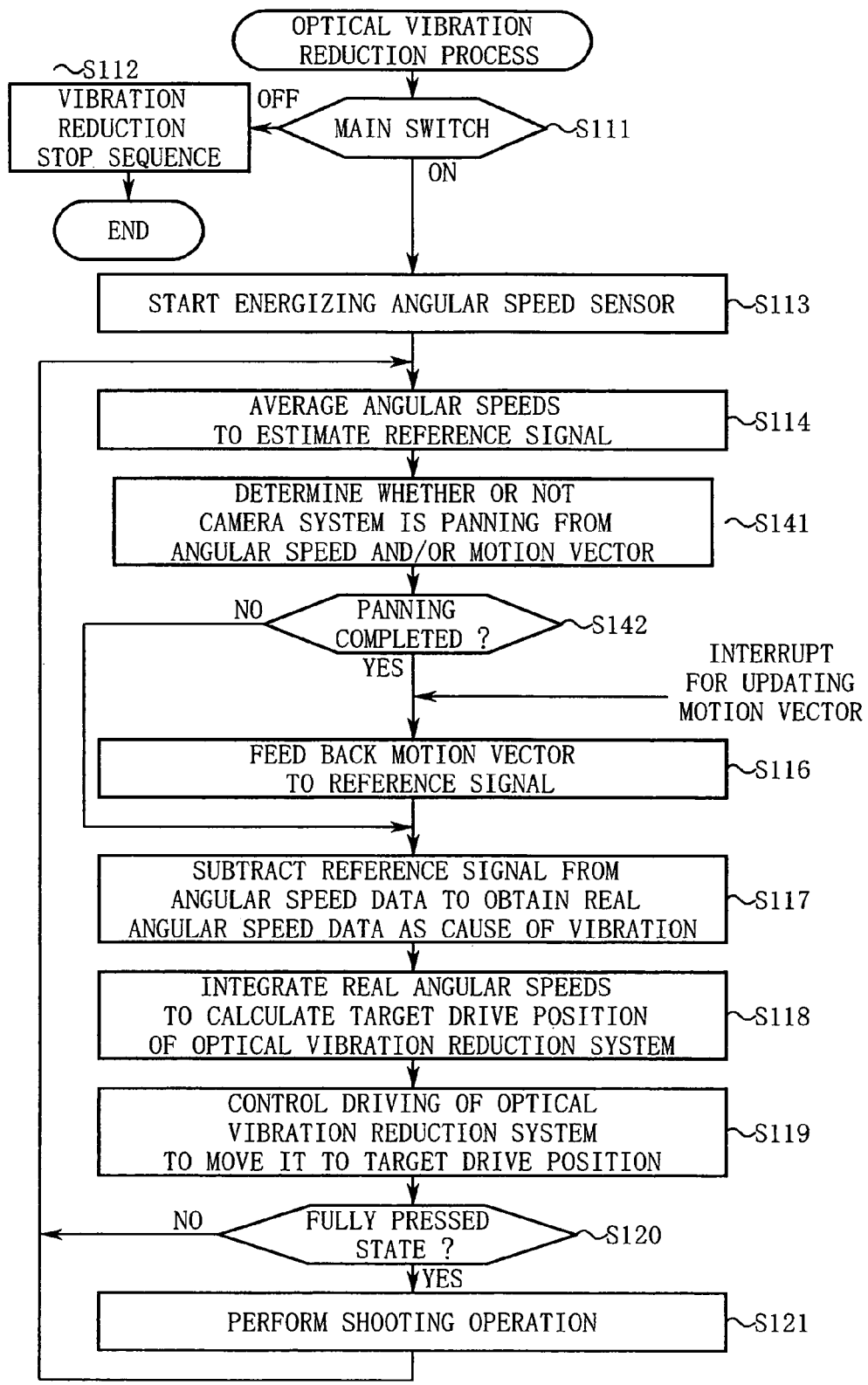
FIG. 16 is a flow chart showing optical vibration reduction according to a fifth embodiment of the present invention.

FIG. 16 is a flow chart showing optical vibration reduction according to the fifth embodiment of the present invention. The fifth embodiment features a structure of which step S115 of the third embodiment (FIG. 14) is replaced with steps S141 and S142 shown in FIG. 16.

At step S141, a panning detecting part 203 detects panning of a camera system 390 according to an output of an angular speed sensor 10 and/or a motion vector V'. When the panning detecting part 203 has successively detected a motion in the same direction according to the output of the angular speed sensor 10 and/or the motion vector V', the panning detecting part 203 determines that the camera system 390 should be panning.

Thereafter, at step S142, the gain changing part 200' decides an operation to perform based on a state of the panning.

In other words, when the camera system 390 is panning in the direction of the vibration reduction, the gain changing part 200' does not feed back the motion vector V' to the reference signal, but causes the flow to advance to step S117.

In contrast, when panning of the camera system 390 in the direction of the vibration reduction has been completed, the gain changing part 200' causes the flow to advance to step S116.

The operation of the fifth embodiment prevents the motion signal from being fed back to the reference signal while the camera system 390 is panning. As a result, it is possible to prevent occurrence of such troubles that the reference signal is erroneously corrected.

This can consequently prevent occurrence of undesired events with sureness such that the motion of an image stops while the camera system 390 is panning and so forth.

According to this embodiment, the feedback of the motion vector is started upon completion of the panning. However, the present invention is not limited to this operation. Alternatively, the gain changing part 200' may increase the feedback gain to increase the feedback instead of starting the feedback of the motion vector. In this case, before and after completion of the panning, the sensitivity of the correction of the reference signal can be finely set and changed.

Next, another embodiment of the present invention will be described.

Sixth Embodiment

Since the structure of an apparatus of the sixth embodiment is the same as that of the third embodiment (FIG. 13), the description will be omitted.

Figure 17:
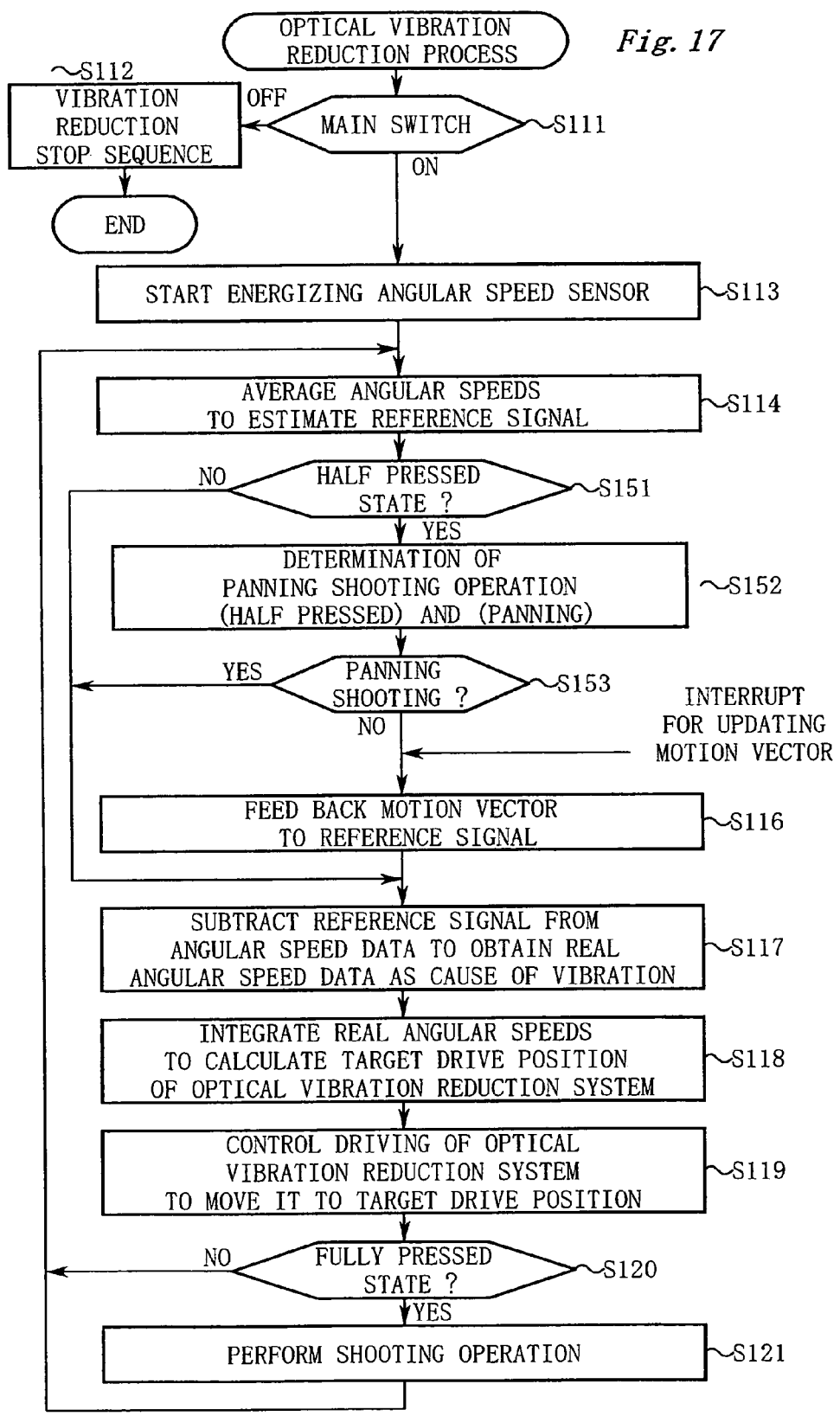
FIG. 17 is a flow chart showing optical vibration reduction according to a sixth embodiment of the present invention.

FIG. 17 is a flow chart showing optical vibration reduction according to the sixth embodiment. The sixth embodiment features a structure of which step S115 (FIG. 14) of the third embodiment is replaced with steps S151 to S153 shown in FIG. 17.

Next, the featured points of the sixth embodiment of the present invention will be described.

Step S151: A gain changing part 200' determines whether or not a release button 201 is half pressed from a contact state of the release button 201.

When the release button 201 is not half pressed, the gain changing part 200' does not feed back the motion vector V' to the reference signal, but causes the flow to advance to step S117.

In contrast, when the release button 201 is half pressed, the gain changing part 200' causes the flow to advance to step S152. In a predetermined period after the half-pressed state is cancelled, since it is supposed that the user may half press the release button 201, it is preferred that the gain changing part 200' should cause the flow to advance to step S152.

Step S152: The gain changing part 200' determines whether or not the camera system 390 is performing a panning shooting operation. Specifically, when the release button 201 is half pressed and the camera system 390 is panning in the direction of the vibration reduction at the same time, the gain changing part 200' determines that the user is preparing for the panning shooting before fully pressing the release button.

Step S153: When determining that the camera system 390 is the panning shooting operation, the gain changing part 200' does not feed back the motion vector V' to the reference signal, but causes the flow to advance to step S117.

In contrast, when determining that the camera system 390 is not performing the panning shooting operation, the gain changing part 200' causes the flow to advance to step S116.

The operation of the sixth embodiment prevents the motion signal from being fed back to the reference signal even if the release button is half pressed. This results in preventing with sureness occurrence of undesired events that the reference signal is erroneously corrected.

Consequently, it is possible to prevent with sureness occurrence of such troubles that the motion of an image stops while the camera system is performing panning shooting operation.

In this embodiment, the feedback of the motion vector is started (or stopped). However, the present invention is not limited to such an operation. Alternatively, the feedback gain may be increased (decreased) rather than starting (stopping) the feedback of the motion vector. In this operation, when the panning shooting operation is tested, the sensitivity of the correction of the reference signal can be finely set (for example, properly decreased).

Supplemental Description of Embodiments

In the foregoing embodiment, a motion vector is generated in accordance with a captured image of the image sensor. However, the present invention is not limited to such an embodiment. For example, a photoelectric conversion may be performed by a multiple-division photometry mechanism, a focal point detecting mechanism, a color measuring mechanism, a finder mechanism, or the like so as to generate a captured image. The generation of a motion vector from the captured image makes the present applicable to a silver salt type camera or a single lens reflex electronic camera.

If the camera is capable of continuous shooting of two to eight frames per second, a motion signal is obtainable. Accordingly, the present invention is applicable to a camera that can perform a vibration reduction operation while shooting continuously.

Moreover, according to the foregoing embodiments, the shooting lens and the camera system may be integrally structured. Alternatively, the shooting lens and the camera system may be detachably structured. If the shooting lens and the camera system are detachably structured, the block that generates the motion signal may be disposed in either the shooting lens or the camera system. For example, it may be structured that the block that generates the motion signal may be disposed in the camera system while the block that converts a scale of the motion signal into a scale of the reference signal may be disposed in the shooting lens.

According to the foregoing embodiments, an angular speed is measured as a vibration detection signal. However, the present invention is not limited thereto. Instead, a vibration component may be detected for estimating displacement of a focal position of a subject image. For example, acceleration, angular acceleration, centrifugal force, inertia force, or the like acting on the camera system may be detected as a vibration detection signal.

In addition, according to the foregoing embodiments, the image vibration is reduced by moving the optical vibration reduction system. However, the vibration reduction mechanism according to the present invention is not limited to such a configuration. Instead, the image vibration reduction is achievable by moving an image sensor or electronically changing the trimming position of a captured image.

In the foregoing embodiments, the start of the shooting preparation is determined from half-press to the release button. However, the present invention is not limited to such an operation. Generally, timing at which shooting preparation starts may be timing at which a shooting preparation for a still image starts. For example, in a period of which is shot is collected, it can be determined that the shooting preparation has started, from preparatory operations such as collection of a various types of information (photometric values or the like) for shooting a still picture. In the foregoing embodiments, the panning of the camera system in the direction of the vibration reduction is determined. In this case, when the camera system is panning in a direction other than the vibration reduction direction, the motion vector is always fed back. As a result, when the camera system 390 is panning in the horizontal direction of the screen, the reference signal in the vertical direction of the screen can be corrected. Consequently, it is possible to properly suppress the vibration in the vertical direction different from the vibration due to the panning. However, the present invention is not limited to such an operation. For example, with detection of panning in a direction different from the direction of the vibration reduction, the feedback of the motion vector can be properly restricted.

It is preferred that panning should be determined by detecting the motion signal while the driving of the vibration reduction of the vibration reducing mechanism is temporarily stopped (or restricted). In this case, since the motion signal is not affected by the vibration reduction, panning can be accurately and securely detected with the motion signal.

The invention is not limited to the above embodiments and various modifications may be made without departing from the spirit and scope of the invention. Any improvement may be made in part or all of the components.

What is claimed is:

1. A shooting lens for forming an image of a subject on an imaging plane of a camera, the shooting lens comprising:
    a vibration reduction mechanism for reducing a vibration of the image of the subject;
    a vibration detecting part which detects a vibration of the camera and outputs a vibration detection signal;
    an information obtaining part which acquires information on a motion signal obtained by analyzing an image shot with the camera; and
    a controlling part which controls, using the vibration detection signal, the vibration reduction mechanism to perform feedforward operation and controls, using the motion signal, the vibration reduction mechanism to perform feedback operation, thereby reducing the image vibration; and
    a center bias part which biases the vibration reduction mechanism to a center position by feeding back displacement of the vibration reduction mechanism from the center position to the control over the vibration reduction mechanism; and wherein
    the controlling part decreases a feedback gain of the motion signal as a feedback gain of the center bias part increases, and increases the feedback gain of the motion signal as the feedback gain of the center bias part decreases.

2. The shooting lens as set forth in claim 1, further comprising:
    a sensor which senses information on at least one of states of the camera which are a state that the camera is fixed by a tripod and a state that the vibration reduction mechanism has moved to its limit, wherein;
    the center bias part increases the feedback gain of the center bias part in accordance with the sensed information on the state of the camera; and
    the controlling part decreases the feedback gain of the motion signal in accordance with the sensed information on the state of the camera.

3. The shooting lens as set forth in claim 1, wherein the controlling part comprises:
    a reference signal estimating part which estimates a reference signal of the vibration detection signal in accordance with the vibration detection signal, the reference signal representing an output of the vibration detecting part while the camera is in a stationary state and free of a vibration;
    a reference signal correcting part which corrects the reference signal by feeding back the motion signal to the reference signal estimated by the reference signal estimating part;
    a target drive position calculating part which obtains a vibration component from a difference between the vibration detection signal and the corrected reference signal, and obtains, in accordance with the vibration component, a target position to which the vibration reduction mechanism is driven, the vibration component causing the vibration of the image, the vibration mechanism reducing the image vibration according to the vibration component; and
    a driving part which controls the vibration reduction mechanism to follow the target position.

4. A shooting lens for forming an image of a subject on an imaging plane of a camera, the shooting lens comprising:
    a vibration reduction mechanism for reducing a vibration of the image of the subject;
    a vibration detecting part which detects a vibration of the camera and outputs a vibration detection signal;
    an information obtaining part which acquires information on a motion signal obtained by analyzing an image shot with the camera; and
    a controlling part which controls, using the vibration detection signal, the vibration reduction mechanism to perform feedforward operation and controls, using the motion signal, the vibration reduction mechanism to perform feedback operation, thereby reducing the image vibration, wherein
    for stopping the vibration reduction by the vibration reduction mechanism, the controlling part controls the vibration reduction mechanism to stop the feedback operation before stopping the feedforward operation.

5. The shooting lens as set forth in claim 4, further comprising:
    a sensor which senses information on at least one of states of the camera which are a state that the camera is fixed by a tripod, a state that the camera is panning, and a state that the vibration reduction mechanism has moved to its limit, wherein
    the controlling part stops the feedback operation first according to the sensed information on the state of the camera and then stops the feedforward operation.

6. The shooting lens as set forth in claim 4, wherein the controlling part comprises:
    a reference signal estimating part which estimates a reference signal of the vibration detection signal in accordance with the vibration detection signal, the reference signal representing an output of the vibration detecting part while the camera is in a stationary state and free of a vibration;
    a reference signal correcting part which corrects the reference signal by feeding back the motion signal to the reference signal estimated by the reference signal estimating part;
    a target drive position calculating part which obtains a vibration component from a difference between the vibration detection signal and the corrected reference signal, and obtains, in accordance with the vibration component, a target position to which the vibration reduction mechanism is driven, the vibration component causing the vibration of the image, the vibration mechanism reducing the image vibration according to the vibration component; and
    a driving part which controls the vibration reduction mechanism to follow the target position.

* * * * *